United States Patent
Gopalan

(10) Patent No.: US 10,410,133 B2
(45) Date of Patent: Sep. 10, 2019

(54) METHODS, DEVICES AND SYSTEMS FOR MANAGING NETWORK VIDEO TRAFFIC

(71) Applicant: AT&T INTELLECTUAL PROPERTY I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 218 days.

(21) Appl. No.: 15/465,834

(22) Filed: Mar. 22, 2017

(65) Prior Publication Data
US 2018/0278543 A1    Sep. 27, 2018

(51) Int. Cl.
| | |
|---|---|
| *G06N 7/00* | (2006.01) |
| *H04L 12/911* | (2013.01) |
| *G06N 3/08* | (2006.01) |
| *G06N 3/04* | (2006.01) |
| *H04L 12/24* | (2006.01) |
| *H04L 12/26* | (2006.01) |
| *H04L 12/729* | (2013.01) |

(Continued)

(52) U.S. Cl.
CPC .............. *G06N 7/005* (2013.01); *G06N 3/04* (2013.01); *G06N 3/08* (2013.01); *H04L 41/0806* (2013.01); *H04L 41/0896* (2013.01); *H04L 43/0876* (2013.01); *H04L 45/08* (2013.01); *H04L 45/125* (2013.01); *H04L 45/22* (2013.01); *H04L 47/823* (2013.01); *H04L 43/16* (2013.01)

(58) Field of Classification Search
None
See application file for complete search history.

(56) References Cited

U.S. PATENT DOCUMENTS

| | | |
|---|---|---|
| 6,947,378 B2 | 9/2005 | Wu et al. |
| 7,706,384 B2 | 4/2010 | van Beek et al. |

(Continued)

FOREIGN PATENT DOCUMENTS

KR    101161249 B1    6/2012

OTHER PUBLICATIONS

Cui, Yuwei et al., "Continuous online sequence learning with an unsupervised neural network model", arXiv preprint arXiv:1512.05463, 2015, 1-17.

(Continued)

*Primary Examiner* — Jeffrey R Swearingen
(74) *Attorney, Agent, or Firm* — Guntin & Gust, PLC; Andrew Raymond

(57) ABSTRACT

Aspects of the subject disclosure may include, for example, embodiments include receiving training data comprising historical states for network resources of a communication network. Further embodiments include generating a Riemannian geometry of the communication network according to the historical states for network resources. Each network resource is one of a vertex or an edge within the first Riemannian geometry. Additional embodiments include determining paths along the Riemannian geometry. Each path comprises at least one network resource. Also, embodiments include determining a velocity vector of each path according to at least one historical state. Embodiments include identifying a group of velocity vectors that generate a sub-geometry within the Riemannian geometry and provisioning a portion of network resources according to the group of velocity vectors and the sub-geometry. Other embodiments are disclosed.

20 Claims, 19 Drawing Sheets

(51) Int. Cl.
*H04L 12/751* (2013.01)
*H04L 12/707* (2013.01)

(56) References Cited

U.S. PATENT DOCUMENTS

| | | |
|---|---|---|
| 8,406,134 B2 | 3/2013 | Johnston et al. |
| 8,531,961 B2 | 9/2013 | Stanwood et al. |
| 8,972,145 B2 | 3/2015 | Mahler et al. |
| 9,060,208 B2 | 6/2015 | Rieger et al. |
| 9,378,065 B2 | 6/2016 | Redmond et al. |
| 9,535,563 B2 | 1/2017 | Hoffberg |
| 9,552,550 B2 | 1/2017 | Vasseur et al. |
| 2002/0176361 A1 | 11/2002 | Wu et al. |
| 2006/0223649 A1 | 10/2006 | Rife et al. |
| 2012/0023226 A1 | 1/2012 | Petersen et al. |
| 2012/0063404 A1 | 3/2012 | Wagner et al. |
| 2014/0113600 A1 | 4/2014 | El Gamal et al. |
| 2014/0321378 A1 | 10/2014 | Zhang et al. |
| 2015/0009857 A1 | 1/2015 | Rath et al. |
| 2015/0012257 A1 | 1/2015 | Backholm et al. |
| 2015/0215832 A1 | 7/2015 | Fitzpatrick |
| 2015/0237609 A1 | 8/2015 | Sun |
| 2015/0319093 A1 | 11/2015 | Stolfus |
| 2015/0333986 A1 | 11/2015 | Pang |
| 2016/0026922 A1 | 1/2016 | Vasseur et al. |
| 2016/0028599 A1 | 1/2016 | Vasseur et al. |
| 2016/0028608 A1 | 1/2016 | Dasgupta et al. |
| 2016/0028616 A1 | 1/2016 | Vasseur |
| 2016/0057654 A1 | 2/2016 | Backholm et al. |
| 2016/0242117 A1 | 8/2016 | Lin et al. |
| 2016/0294702 A1 | 10/2016 | Kodialam et al. |

OTHER PUBLICATIONS

Dainotti, Alberto et al., "Internet traffic modeling by means of Hidden Markov Models", Computer Networks 52.14, 2008, 2645-2662.

Elias, Jocelyne, "Joint QoS Routing and Dynamic Capacity Dimensioning with Elastic Traffic A Game Theoretical Perspective", IEEE, 2010.

Lien, Shao-Yu , "Cognitive and game-theoretical radio resource management for autonomous femtocells with QoS guarantees", IEEE Transactions on Wireless Communications 10.7 2196-2206., 2011.

Maheswaran, C.P., "Utilizing EEM approach to tackle bandwidth allocation with respect to heterogeneous wireless networks", ICT Express 2.2: 80-86., 2016.

Nguyen, Thuy T. et al., "A survey of techniques for internet traffic classification using machine learning", IEEE Communications Surveys Tutorials 10.4, 2008, 56-76.

Zhang, Qi et al., "Cloud computing: state-of-the-art and research challenges", Journal of internet services and applications 1.1, Apr. 20, 2010, 7-18.

Zhang, Yichi, "Residential Network Traffic and User Behavior Analysis", KTH—Royal Institute of Technology, Nov. 9, 2010, 1-62.

100

260

300

400

900

1200

METHODS, DEVICES AND SYSTEMS FOR MANAGING NETWORK VIDEO TRAFFIC

RELATED APPLICATION(S)

U.S. patent application Ser. No. 15/465,997 filed Mar. 22, 2017, by Gopalan, entitled "METHODS, DEVICES AND SYSTEMS FOR MANAGING NETWORK VIDEO TRAFFIC" is related to the pending application. All sections of the aforementioned application is incorporated herein by reference in its entirety.

FIELD OF THE DISCLOSURE

The subject disclosure relates to methods, devices, and systems for managing network video traffic.

BACKGROUND

Users request video content from different devices across different communication networks. The difference devices include wearable devices, mobile phones, tablet computers, laptop computers, desktop computers, etc. The video content can be requested from media content servers that store and stream/download video content. Further, content producers may stream video of live events to users. Thus, communication networks manage and support streaming/downloading of stored video content from media content providers as well as support streaming video of live events.

BRIEF DESCRIPTION OF THE DRAWINGS

Reference will now be made to the accompanying drawings, which are not necessarily drawn to scale, and wherein.

and

Figure 15:
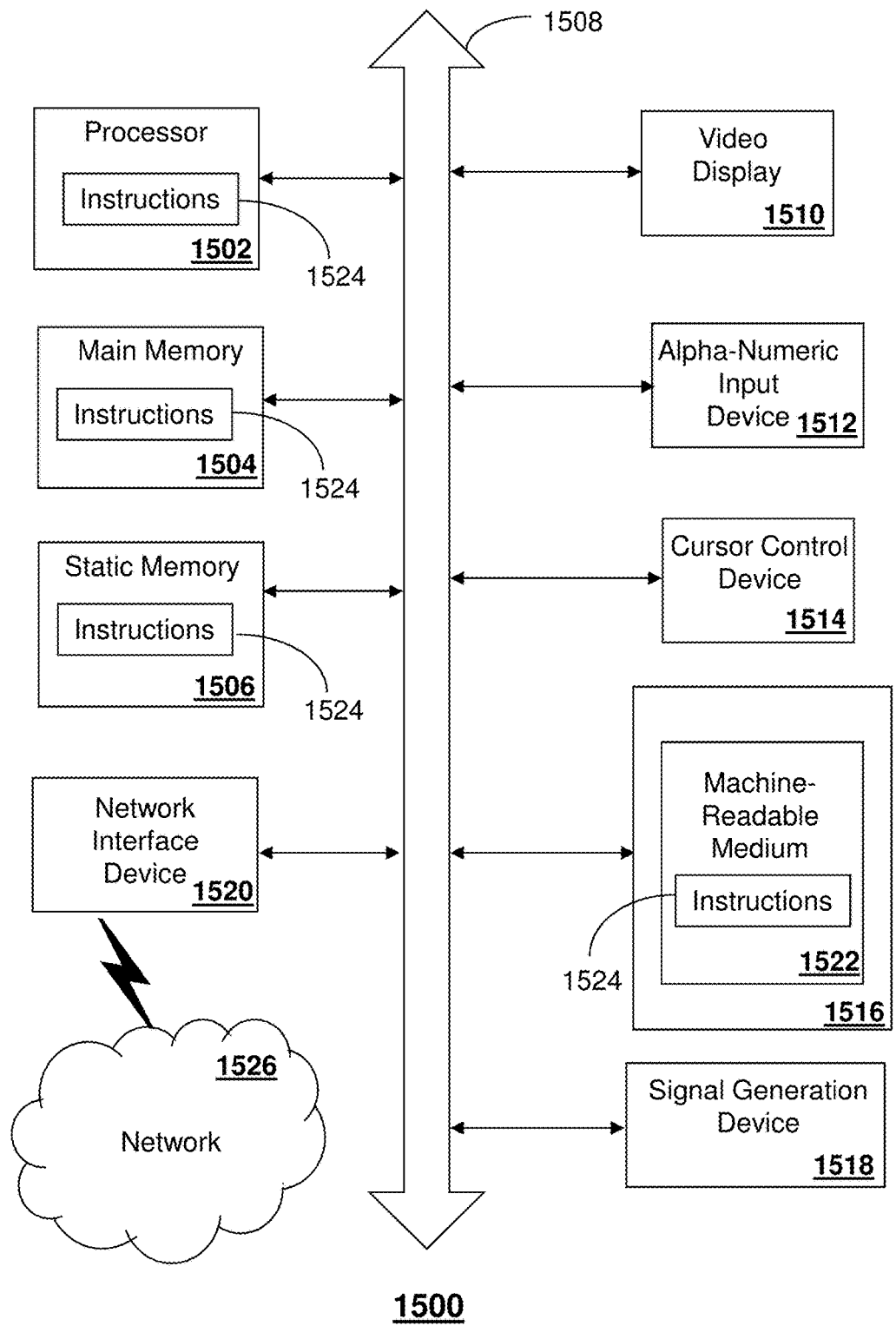

FIG. 15 is a diagrammatic representation of a machine in the form of a computer system within which a set of instructions, when executed, may cause the machine to perform any one or more of the methods described herein.

DETAILED DESCRIPTION

The subject disclosure describes, among other things, illustrative embodiments include receiving training data comprising multiple historical states for each of multiple network resources of a communication network. Further embodiments include generating a Riemannian geometry of the communication network according to the multiple historical states for each of the multiple network resources. Each of the multiple network resources is one of a vertex or an edge within the Riemannian geometry. Additional embodiments include determining multiple paths along the Riemannian geometry. Each path in the plurality of paths comprises at least one of the multiple network resources. Also, embodiments include determining a velocity vector of each path according to at least one state of the multiple historical states. Also, embodiments include identifying a group of velocity vectors that generate a sub-geometry within the Riemannian geometry. Embodiments include provisioning a portion of the multiple network resources according to the group of velocity vectors and the sub-geometry. Other embodiments are described in the subject disclosure.

One or more aspects of the subject disclosure include a device comprising a processing system including a processor and a memory that stores executable instructions that, when executed by the processing system, facilitate performance of operations. Operations can include receiving training data comprising multiple historical states for each of multiple network resources of a communication network. Further operations can include generating a Riemannian geometry of the communication network according to the multiple historical states for each of the multiple network resources. Each of the multiple network resources is one of a vertex or an edge within the Riemannian geometry. Additional operations can include determining multiple paths along the Riemannian geometry. Each path in the multiple paths comprises at least one of the multiple network resources. Also, operations can include determining a velocity vector of each path of the plurality of paths according to at least one state of the multiple historical states. Operations can include identifying a group of velocity vectors that generate a sub-geometry within the Riemannian geometry. Further operations can include provisioning a portion of the multiple network resources according to the group of velocity vectors and the sub-geometry.

One or more aspects of the subject disclosure include a machine-readable storage medium, comprising executable instructions that, when executed by a processing system including a processor, facilitate performance of operations. Operations can include receiving multiple historical states for each of multiple network resources of a communication network. Further operations can include generating a Riemannian geometry of the communication network according to the multiple historical states for each of the multiple network resources. Each of the multiple network resources is one of a vertex or an edge within the Riemannian geometry. Additional operations can include determining multiple paths along the Riemannian geometry. Each path in the multiple paths comprises at least one of the multiple network resources. Also, operations ca include determining a velocity vector of each path of the plurality of paths according to at least one state of the multiple historical states. Operations can include identifying a group of velocity vectors that generate a sub-geometry within the Riemannian geometry. Further operations can include calculating an aggregate velocity for the group of velocity vectors according to a velocity associated with each velocity vector of the group of velocity vectors. Additional operations can include determining the aggregate velocity is below a predetermined threshold. Also, operations can include provisioning a portion of the multiple network resources according to the group of velocity vectors and the sub-geometry.

One or more aspects of the subject disclosure include a method. The can include monitoring, by a processing system including a processor, multiple current states for each of multiple network resources in a communication network. Further, the method can include calculating, by the processing system, a current aggregate velocity for a group of velocity vectors according to the multiple current states. In addition, the method can include identifying, by the processing system, a model error according to the current aggregate velocity and a previous aggregate velocity. The previous aggregate velocity is for the group of velocity vectors according to multiple historical states for each of the multiple network resources and determining, by the processing system, the model error is above a tolerance.

Figure 1:
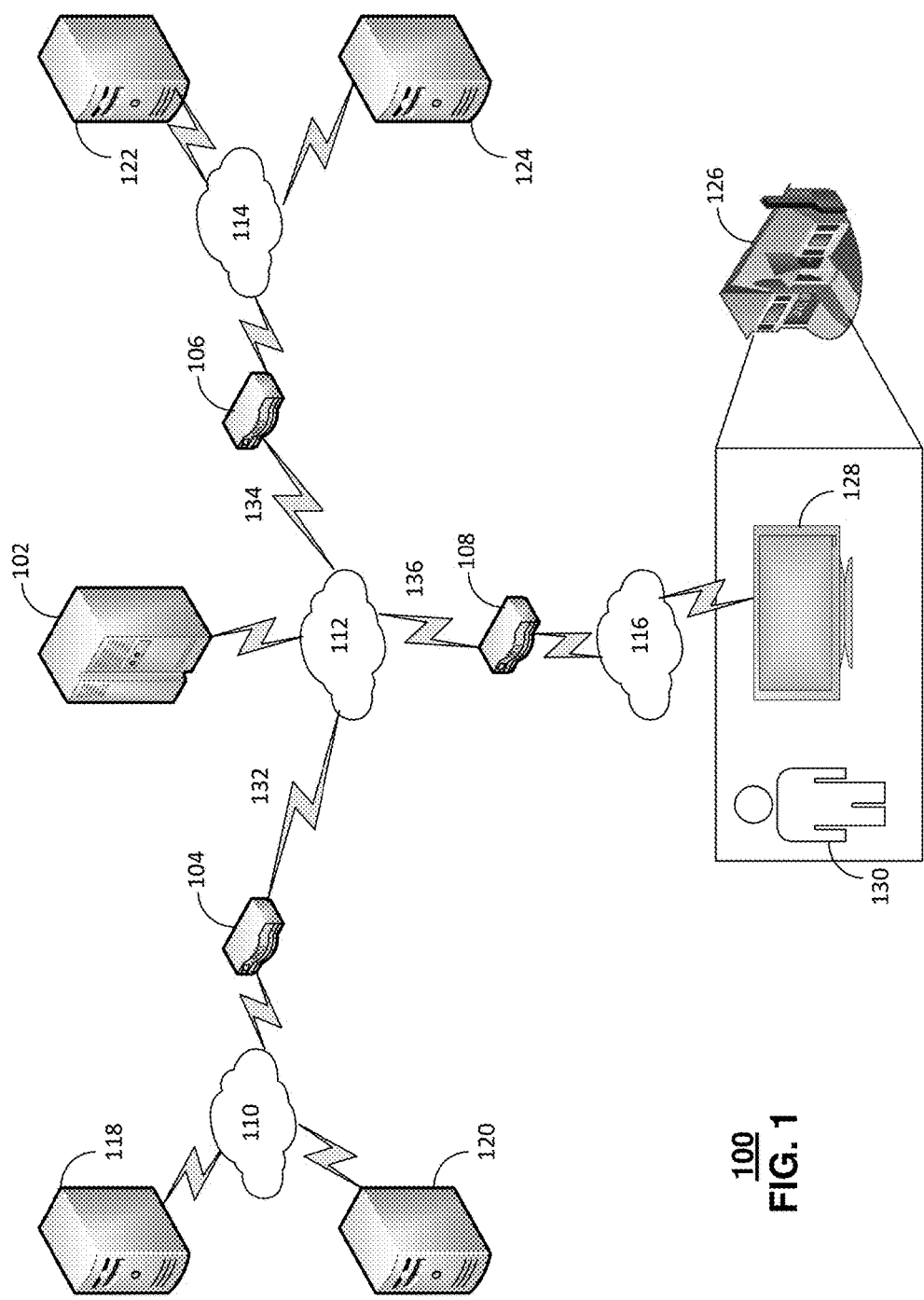
FIG. 1 depicts an illustrative embodiment of a system for managing network video traffic.

FIG. 1 depicts an illustrative embodiment of system 100 for managing network video traffic. In one or more embodiments, system 100 includes a network manager 102 communicatively coupled to routers 104, 106, 108 over communication network 112. Further, the routers 104, 106 can be communicatively coupled to media servers 118, 120, 122, 124 over communication networks 110, 114. In addition, router 108 can be communicatively coupled, via communication network 116, to a media device 128 located on customer premises 126 and viewed by a user 130 to access media content from the media servers 118, 120, 122, 124. In other embodiments, mobile devices such as smartphones, tablet computers, laptop computers, and wearable device may be used communicatively coupled to the media servers 118, 120, 122, 124 to access media content as well as other media devices (e.g. desktop computers, etc.).

In one or more embodiments, the network manager 102 can allocate network resources such as processing capacity on routers 104, 106, 108 and bandwidth on communication links 132, 134, 136 based on the network video traffic across communication networks 110, 112, 114, 116. Such allocation of network can be done dynamically and/or real time. The network manager 102 can include a machine learning application stored in memory and implemented by a processing system of the network manager 102. The processing system can be co-located with the router 104, 106, 108 or distributed among different locations (e.g. cloud environment, distributed processing environment, etc.) The machine learning application can include a neural network integrated with one or more Markov logic state diagrams.

In one or more embodiments, prior to implementing machine learning application on actual/current network video traffic, the machine learning application is trained with historical network video traffic. In some embodiments, the historical network video traffic can be actual historical network video traffic recorded/measured traffic at different points within communication networks 110, 112, 114, 116, communication links 132, 134, 136, and/or routers 104, 106, 108. Further, the historical network video traffic can be recorded at different times to provide a robust set of training data for the machine learning application. In other embodiments, the historical network video traffic can calculated based on historical network video traffic of similar communication networks or calculated based on the historical network video traffic produced by similarly situated media content servers 118, 120, 122, 124.

In one or more embodiments, the network manager 102 can detect current network video traffic from media content servers 118, 120, 122, 124. For example, media servers 118, 120, 122, 124 can provide high network video traffic at certain times of day such as in the evenings between 7 pm-10 pm ET when most people are at home and request streaming media content. At other times of day, media servers 118, 120, 122, 124 provide low network video traffic. Such network video traffic can be according to the data used to train the machine learning application on the network manager 102. Consequently, the network manager 102 allocates a certain (low) level of network resources to the communication networks 110, 112, 114, 116 communicatively coupled to the media servers 118, 120, 122, 124. For example, when the network video traffic is at a high level, routers 104, 106, 108 can be provisioned by the network manager 102 with more memory from storage devices (remote or co-located storage devices) and processing power (from co-located or distributed, cloud processing systems). Further, the network manager 102 can provision more bandwidth capacity on communication links 132, 134, 136. For example, communication links 132, 134, 136 can be optical communication links that can carry multiple wavelengths of optical communications. The network manager can provision more wavelengths on the communication links 132, 134, 136 to carry more media content from media servers 118, 120, 122, 124 to customer premises 126.

Figure 2A:
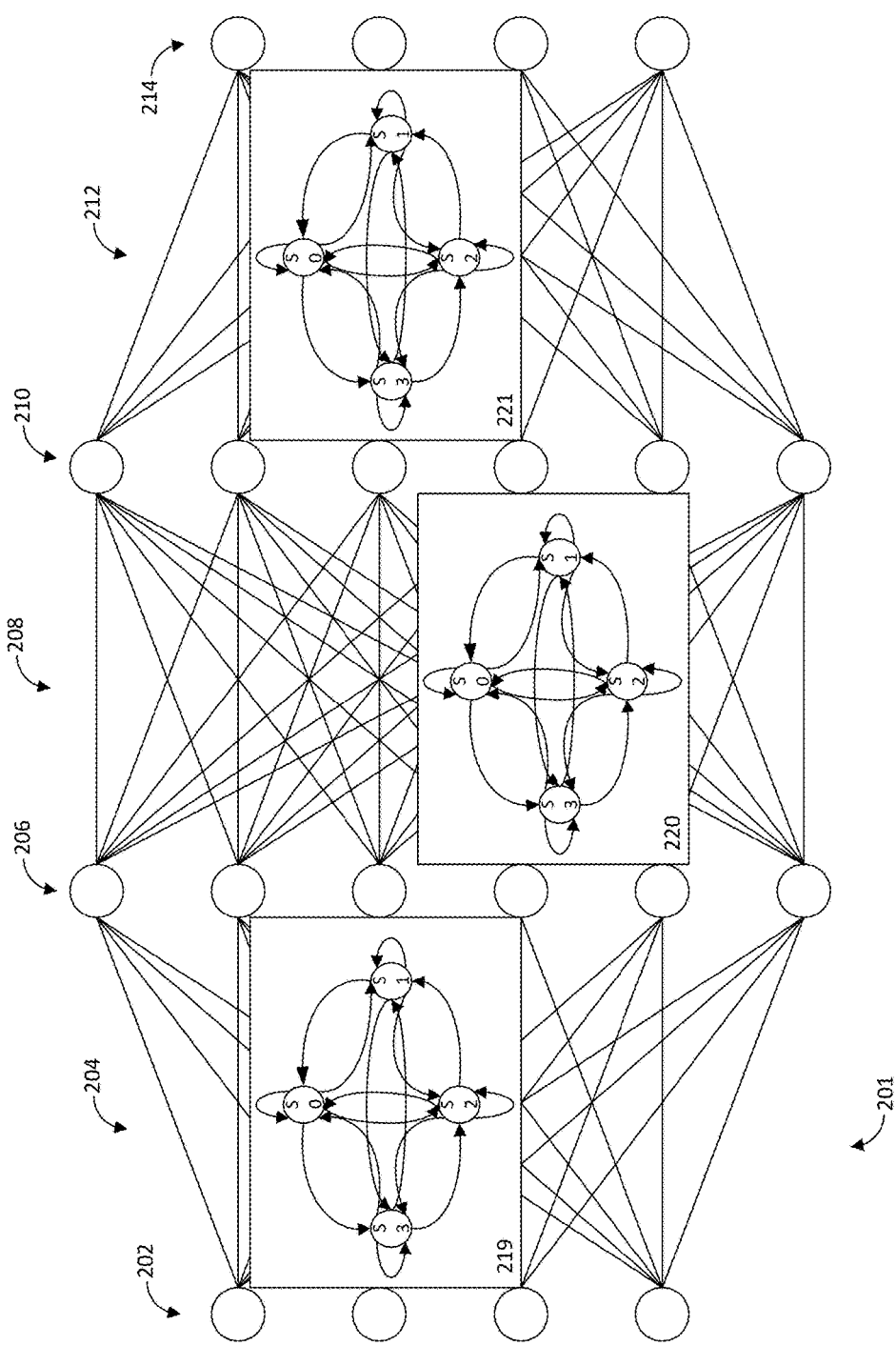
FIG. 2A depicts an illustrative embodiment of a neural network integrated with Markov logic state machines used in managing network video traffic.

FIG. 2A depicts an illustrative embodiment of a neural network integrated with Markov logic state machines used in managing network video traffic. In one or more embodiments, the network manager 102 includes a machine learning application that uses a statistic-syntactic (model) system 200 comprising the neural network 201 integrated with Markov logic state machines 219, 222, 221. The neural network 201 includes an input layer 202, several hidden layers 206, 210, and an output layers 214. Each layer comprises multiple nodes. Each node of one layer is interconnected with nodes in a neighboring layers. Such interconnections 204, 208, 212 can be driven by the Markov logic state machines 219, 220, 221.

In one or more embodiments, each node can be a processor with a transfer function that processes many inputs into an output. Further, each of the inputs can be weighted. For example, a processor can model/correspond a communication link in a network. Each input can be the bandwidth for streams of media content provided by a media server 118, 120, 122, 124. Further, a weight for each input can be according to the potential highest level of bandwidth of the aggregate media content provided by each media server 118, 120, 122, 124 or the bandwidth allocated according to agreements for quality of service for each of the media servers 118, 120, 122, 124 by the service provider operating the network manager 102. In addition, the neural network is trained with historical network video traffic. For example, a node may model a communication link and may have four inputs, each of which model/correspond a video traffic from each of four media servers, 118, 120, 122, 124. The inputs modeling video traffic from media servers 118, 120, 122 may be weighted with a factor of 1 and the input modeling video traffic from media server 124 may be weighted with a factor of 2. That is, the model allows twice as much bandwidth to be allocated to video traffic from media server 124 than to video traffic from media servers 118, 120, 122. The weights can be configured according to the potential high level of bandwidth that can be provided by each of the media servers 118, 120, 122, 124 or according to agreements between the service provider and the different media content providers operating media servers 118, 120, 122, 124. For example, media server highest level of output can be 100 Gbps while the highest level of output for each of the media servers 118, 120, 122 is 50 Gbps.

Figure 2B:
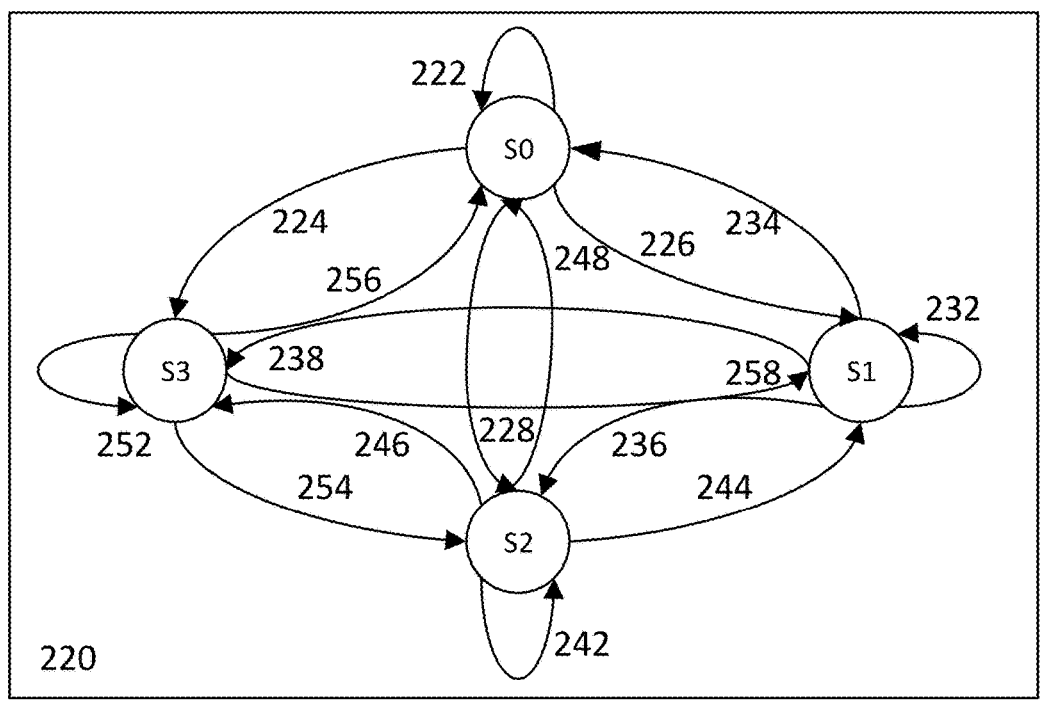
FIG. 2B depicts an illustrative embodiment of a Markov logic state machine used in managing network video traffic.

FIG. 2B depicts an illustrative embodiment of a Markov logic state machine 220 used in managing network video traffic. In one or more embodiments, a Markov logic state machine 220 can include four states, S0, S1, S2, S3 representing the bandwidth of a communication link, processing power of a router, or other network resources of a communication network that carries, processes, or stores network video traffic. S0 may indicate a low level equilibrium state for the network resource. S2 may indicate a high level equilibrium state for the network resource. S1 can indicate a negative transition state of resources for the network resource, and S3 can indicate a positive transition state of resources for the network resource. Further, state transitions 222, 224, 226, 228, 232, 234, 236, 238, 242, 244, 246, 248, 252, 254, 256, 258 indicate the probabilities of transitioning from one state to another or remaining in the same state. The probabilities for one or more state transitions can change over time.

For example, if the Markov logic state machine 220 models a communication link having a capacity of 200 Gbps, then S0 may be a low level equilibrium state of operating at 50 Gbps. Further, S2 may be a high level equilibrium state of operating at 150 Gbps. S1 may be a negative transition state that indicates capacity of the communication link is decreasing at an increment of 10 Gbps. S3 may be a positive transition state that indicates capacity of the communication link is increasing at an increment of 10 Gbps. In addition, the probability of state transitions 222, 224, 226, 228, 232, 234, 236, 238, 242, 244, 246, 248, 252, 254, 256, 258 can change over time.

Furthering the example, during 9 am-5 pm on weekdays, the bandwidth capacity of the communication link is at a low level of equilibrium of 50 Gbps because many people are at work and not streaming or downloading video content from media servers 118, 120, 122, 124. Thus, probability of the state transition 222 for the communication link to remain in such a state may be high (e.g. 95%). Further, the probability of the state transitions 224, 226, 228 to increase or decrease the bandwidth of the communication link by 10 Gbps (e.g. 2% each) or transitioning to the high level equilibrium state (e.g. 1%) may be relatively low. Further, if during 9 am-5 pm on weekdays the Markov state machine is in state S1 or S3, then it may be a rare occurrence. The probability of state transitions 234, 256 from S1 and S3 to S0 can be high (e.g. 95%), and the other probabilities of state transitions 232, 238, 252, 258 (e.g. 2%) to S1 and S3 to be low. In addition, the probability for state transitions 236, 254 from S1 and S3 to S2 can also be low (e.g. 1%). Also, if during 9 am-5 pm on weekdays the Markov state machine is in state S2, then it may be a rare occurrence. The probability of the state transition 248 to S0 may be high (e.g. 95%). Further, the probability of state transitions 244, 246 from S2 to S1 and S3 may be low (e.g. 2%) as well as to remaining in S3 (e.g. 1%).

In another example, during 7 pm-10 pm on weekdays, the bandwidth capacity of the communication link is may start a low level of equilibrium of 50 Gbps but may steadily increase to a high level of equilibrium of 150 Gbps due to people being home from work and streaming and downloading media content to relax after a hard day at work. Thus, probability of the state transition 222 for the communication link to remain in such a state may be low (e.g. 10%). Further, the probability of the state transitions 224, 226, 228 to increase or decrease the bandwidth of the communication link by 10 Gbps or transitioning to the high level equilibrium state (e.g. 30%) may be relatively high. Further, the probability of state transitions 234, 256 from S1 and S3 to S0 can be low (e.g. 10%), and the other probabilities of state transitions 232, 238, 252, 258 to S1 and S3 as well as the probability for state transitions 236, 254 from S1 and S3 to S2 to be high (e.g. 30%). Also, if during 9 am-5 pm on weekdays the Markov state machine is in state S2, then it may be a likely occurrence. The probability of the state transition 248 to S0 may be low (e.g. 10%). Further, the probability of state transitions 244, 246 from S2 to S1 and S3 may be high (e.g. 30%) as well as to remaining in S3 (e.g. 30%). When integrated with the neural network, once a Markov logic state machine remains in a high level equilibrium state, it triggers the neural network/machine learning application of the network manager 102 to allocate further network resources (e.g. increase the bandwidth capacity of the communication link by adding wavelengths to an optical communication link).

In a further example, if the Markov logic state machine 220 models a router processing capacity, then S0 may be a low level equilibrium state of operating at 25%. Further, S2 may be a high level equilibrium state of operating at 75%. S1 may be a negative transition state that indicates processing capacity of the router is decreasing at an increment of 5%. S3 may be a positive transition state that indicates processing capacity of the router is increasing at an increment of 5%. In addition, the probability of state transitions 222, 224, 226, 228, 232, 234, 236, 238, 242, 244, 246, 248, 252, 254, 256, 258 can change over time.

Furthering the example, during 9 am-5 pm on weekdays, the processor capacity of the router is at a low level of equilibrium of 5% because many people are at work and not streaming or downloading video content from media servers 118, 120, 122, 124. Thus, probability of the state transition 222 for the communication link to remain in such a state may be high (e.g. 95%). Further, the probability of the state transitions 224, 226, 228 to increase or decrease the processor capacity of the communication link by 5% (e.g. 2% each) or transitioning to the high level equilibrium state (e.g. 1%) may be relatively low. Further, if during 9 am-5 pm on weekdays the Markov state machine is in state S1 or S3, then it may be a rare occurrence. The probability of state transitions 234, 256 from S1 and S3 to S0 can be high (e.g. 95%), and the other probabilities of state transitions 232, 238, 252, 258 (e.g. 2%) to S1 and S3 to be low. In addition, the probability for state transitions 236, 254 from S1 and S3 to S2 can also be low (e.g. 1%). Also, if during 9 am-5 pm on weekdays the Markov state machine is in state S2, then it may be a rare occurrence. The probability of the state transition 248 to S0 may be high (e.g. 95%). Further, the probability of state transitions 244, 246 from S2 to S1 and S3 may be low (e.g. 2%) as well as to remaining in S3 (e.g. 1%).

In another example, during 7 pm-10 pm on weekdays, the processor capacity of the router may start a low level of equilibrium of 25% but may steadily increase to a high level of equilibrium of 75% due to people being home from work and streaming and downloading media content to relax after a hard day at work. Thus, probability of the state transition 222 for the processing capacity of the router to remain in such a state may be low (e.g. 10%). Further, the probability of the state transitions 224, 226, 228 to increase or decrease the processor capacity of the router by 5% or transitioning to the high level equilibrium state (e.g. 30%) may be relatively high. Further, the probability of state transitions 234, 256 from S1 and S3 to S0 can be low (e.g. 10%), and the other probabilities of state transitions 232, 238, 252, 258 to S1 and S3 as well as the probability for state transitions 236, 254 from S1 and S3 to S2 to be high (e.g. 30%). Also, if during 9 am-5 pm on weekdays the Markov state machine is in state S2, then it may be a likely occurrence. The probability of the state transition 248 to S0 may be low (e.g. 10%). Further, the probability of state transitions 244, 246 from S2 to S1 and S3 may be high (e.g. 30%) as well as to remaining in S3 (e.g. 30%). When integrated with the neural network, once a Markov logic state machine remains in a high level equilibrium state, it triggers the neural network/machine learning application of the network manager 102 to allocate further network resources (e.g. increase the processor capacity of the router by allocating more processors from a distributed processing environment to the router).

In one or more embodiments, the Markov logic state machines 219, 220, 221 can be used with the inputs to nodes within the neural network. Further, the Markov logic state machines can be used to develop weights for the inputs to nodes in each layers of the neural network. Incorporating the Markov logic state machine with a neural network allows for a network manager to more robustly allocate network resources to efficiently carry the current network video traffic across communication networks.

Figure 3:
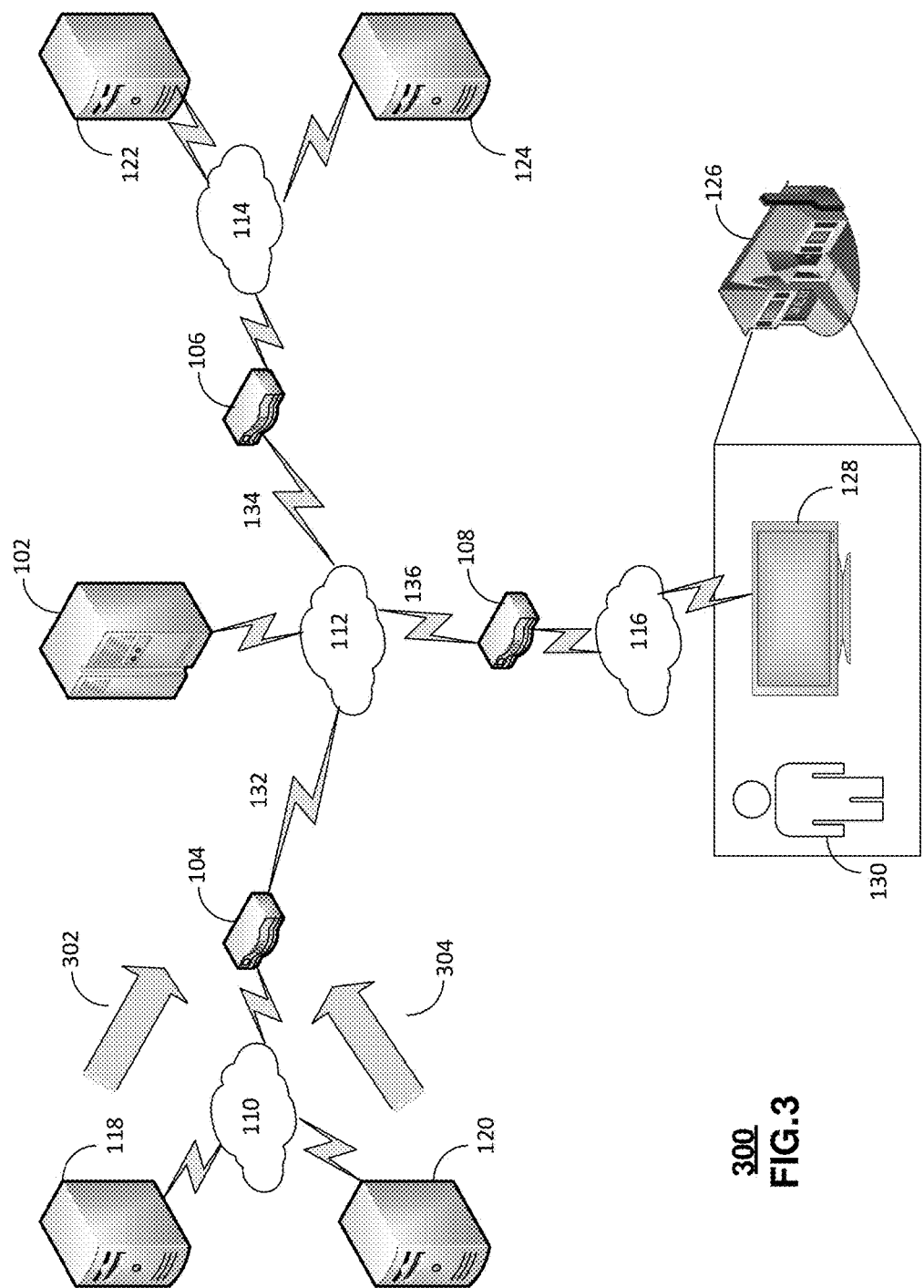
FIGS. 3-4 depict illustrative embodiments of systems for managing network video traffic.
Figure 4:
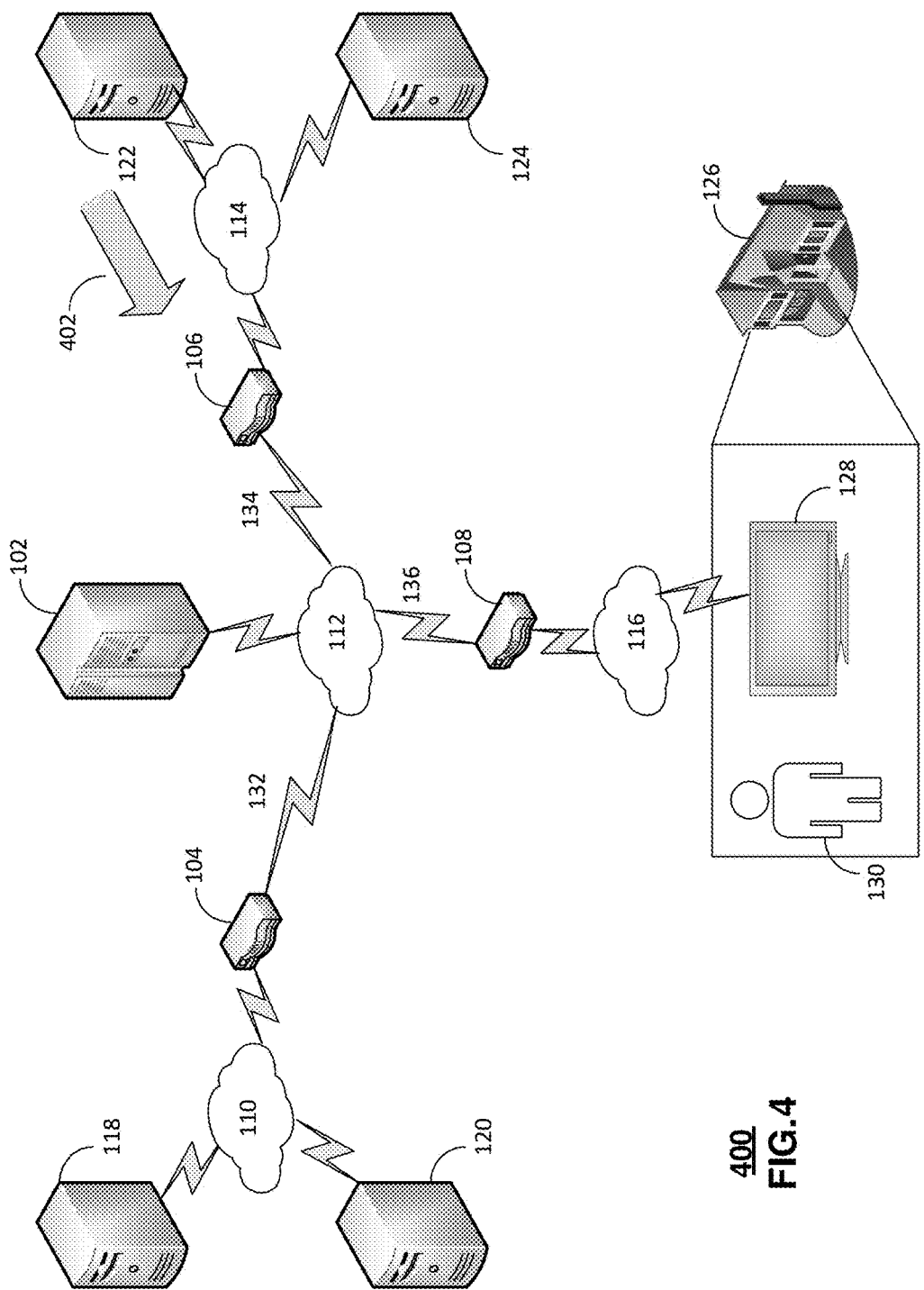

FIGS. 3-4 depict illustrative embodiments of systems for managing network video traffic. Referring to FIG. 3, in one or more embodiments, the system 300 includes components of system 100. Further, media servers 118, 120 increase their level 302, 304 of network video traffic (e.g. providing media content to users). Such increase in level of network video traffic can be transitory (e.g. first of the month so there are new media content is accessed by users) or more permanent (e.g. media servers 118 and 120 have substantially increased their library of media content).

In one or more embodiments, the network manager 102 observes or detects current network video traffic. Further, the network manager 102 identifies or otherwise determines that the current network traffic does not conform to the historical network video traffic or any other data used in training the machine learning application of the network manager 102. For example, the average network video traffic according to the historical network video traffic from media server 118, 120 can be 100 Gbps. However, the current network video traffic indicates that the average network video traffic from media server 118, 120 has increased to 150 Gbps. In response, the network manager 102 records or compiles the current network video traffic. Further, the network manager 102 re-trains the machine learning application using the current network video traffic. In addition, the network manager 102 re-provisions the network resources (e.g. processing systems/processing capacity associated with routers 104, 106, 108, bandwidth of communication links 132, 134, 136, memory allocated to routers, etc.) according to instructions from the re-trained machine learning application. Retraining the machine learning application can include determining the multiple layers of the neural network of the machine learning application according to the re-training based on the current network video traffic.

In one or more embodiments, the network manager 102 observes or otherwise detects current network video traffic that does not conform to the historical network video traffic or data used in training the machine learning application. Further, the network manager 102 can develop or identify one or more (additional) statistical states to include in the Markov logic state machine according to the current network video traffic. In other embodiments, the network manager 102 can determine one or more new/updated Markov logic state machines according to the current network video traffic. In addition, the network manager can adjust, as part of re-training the machine learning, one or more Markov logic state machines to include the one or more new statistical states or adjust the machine learning application to include the newly identified or develop Markov logic state machines.

Referring to FIG. 4, in one or more embodiments, system 400 can include the components from system 100. In some embodiments, a media server 122 may provide media content of a live event some time in the future. For example, media server 122 can receive real-time, live media content of a live concert to be streamed to users. This predicted network video traffic is provided and received by the network manager 102.

In one or more embodiments, media server 122 can increase its level 402, of network video traffic (e.g. providing media content to users). Such increase in level of network video traffic can be transitory (e.g. a live event). In some embodiments, the network manager 102 identifies or otherwise determines that the predicted network traffic does not conform to the historical network video traffic or any other data used in training the machine learning application of the network manager 102. For example, the average network video traffic according to the historical network video traffic from media server 122 can be 100 Gbps. However, the current network video traffic indicates that the average network video traffic from media server 122 has increased to 200 Gbps. Further, the network manager 102 re-trains the machine learning application using the predicted network video traffic. In addition, the network manager 102 re-provisions the network resources (e.g. processing systems/processing capacity associated with routers 104, 106, 108, bandwidth of communication links 132, 134, 136) according to the re-trained machine learning application. Retraining the machine learning application can include determining the multiple layers of the neural network of the machine learning application according to the re-training based on the current network video traffic.

In one or more embodiments, the network manager 102 determines predicted network video traffic that does not conform to the historical network video traffic or data used in training the machine learning application. Further, the network manager 102 can develop or identify one or more statistical states to include in the Markov logic state machine according to the predicted network video traffic. In other embodiments, the network manager 102 can determine one or more new/updated Markov logic state machines according to the predicted network video traffic. In addition, the network manager can adjust, as part of re-training the machine learning, to include the one or more new statistical states or adjust the machine learning application to include the newly identified or develop Markov logic state machines.

Figure 5:
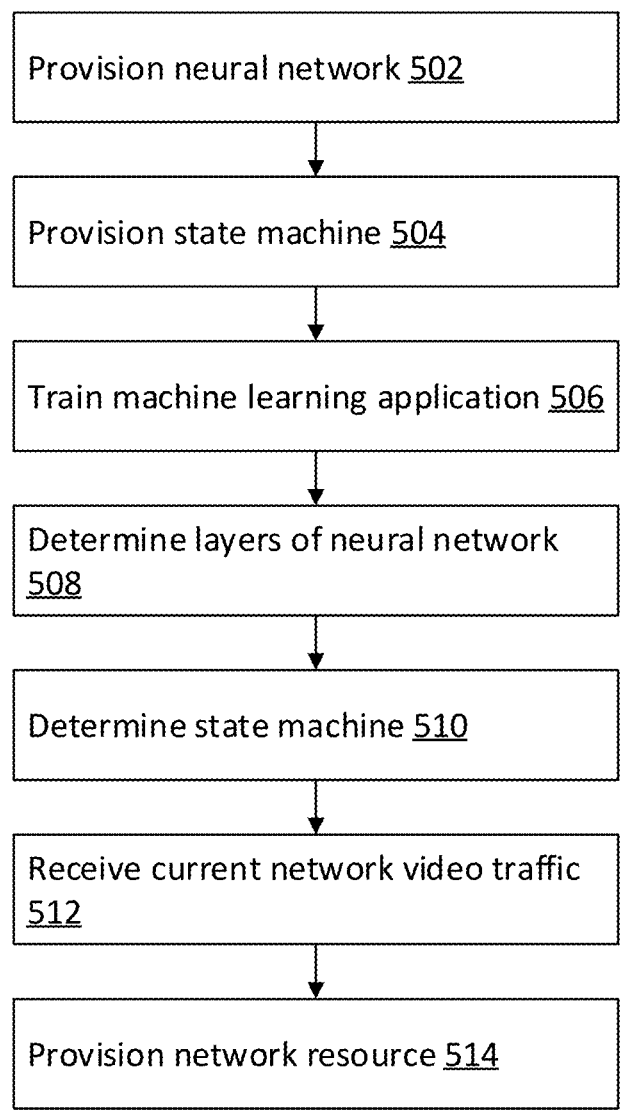
FIGS. 5-7 depict illustrative embodiments of methods used in portions of the systems described in FIGS. 1 and 3-4.
Figure 6:
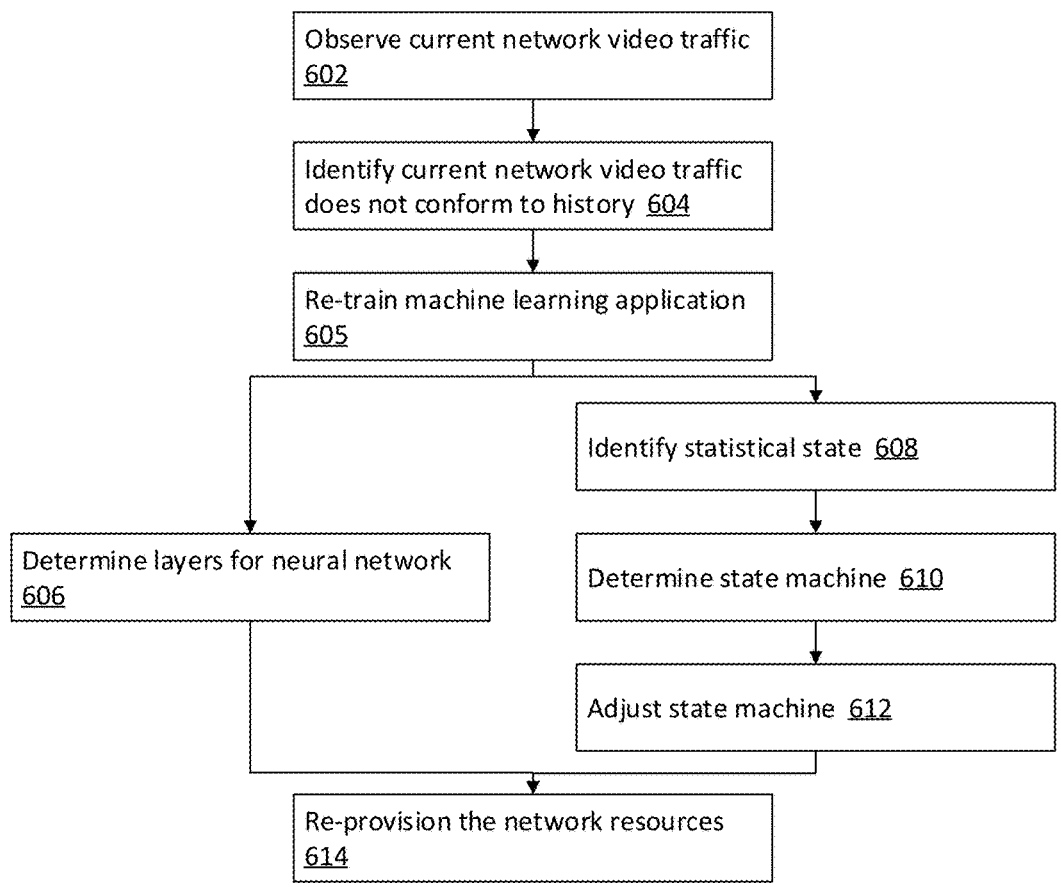
Figure 7:
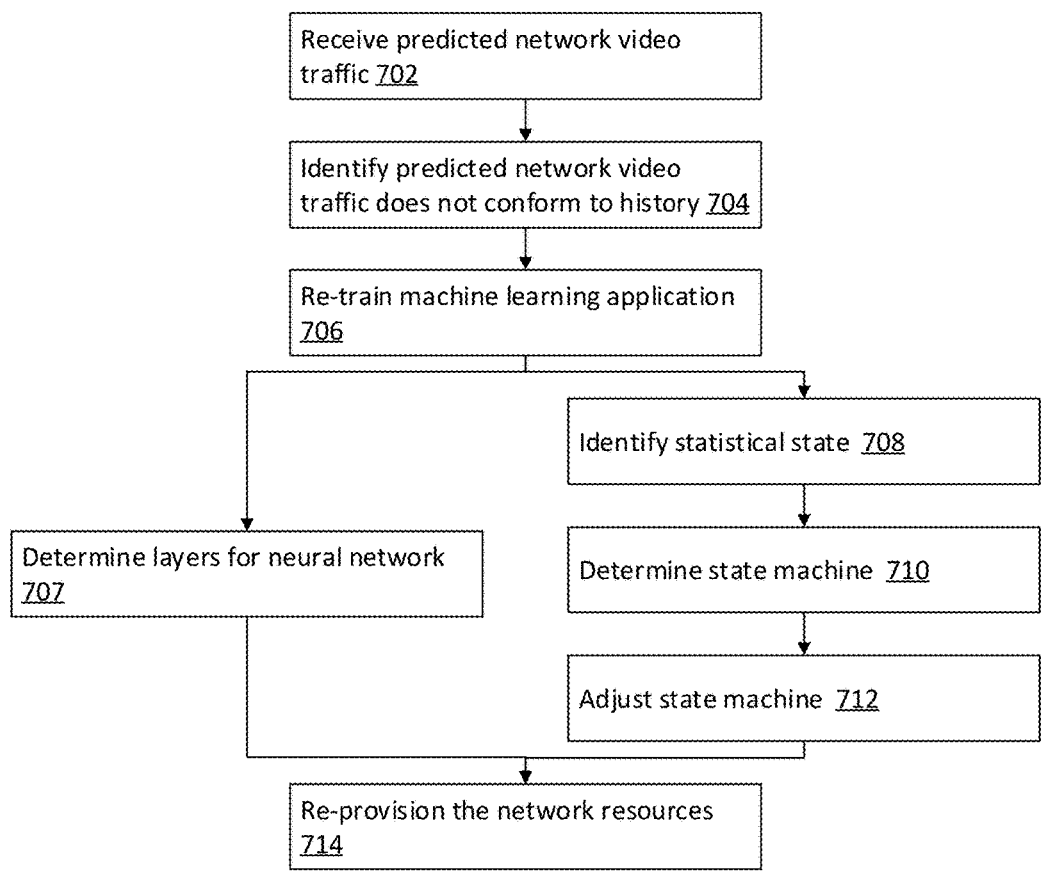

FIGS. 5-7 depict illustrative embodiments of methods used in portions of the systems described in FIGS. 1 and 3-4. The methods 500, 600, 700 can be implemented by a network manager or any other network node. Referring to FIG. 5, in one or more embodiments, the method 500 can include a network manager, at 502, provisioning a neural network. The neural network can be part of the machine learning application that include statistic-syntactic model that includes the neural network. Further, the neural network can include multiple layers. The method 500 can include a network manager, at 504, provisioning multiple Markov logic state machines among the multiple layers of the neural network. Further, the method 500 includes the network manager, at 506, training the machine learning application using historical network video traffic resulting in a trained machine learning application. In addition, the method 500 can include the network manager, at 508, determining the multiple layers of the neural network according to the training based on the historical network video traffic. This can include determining the number of nodes in each layer as well as the interconnections among nodes between layers. Further, this can also include determining the weights of inputs to each node as well as the transfer function of each node. Also, the method 500 can include the network manager, at 510, determining the plurality of Markov logic state machines according to the historical network video traffic. This can include developing or identifying the states of the state machine as well as the transitional probabilities between one state and another. Further, the method 500 can include the network manager, at 512, receiving current network video traffic. In addition, the method 500 can include the network manager, at 514, provisioning network resources to route the current network video traffic according to the trained machine learning application.

Referring to FIG. 6, in one or more embodiments, method 600 can include a network manager, at 602, observing or detecting current network video traffic. Further, the method 600 can include the network manager, at 604, identifying or determining the current network video traffic does not conform to the historical network video traffic. In addition, the method 600 can include the network manager, at 605, re-training the machine learning application using the current network video traffic resulting in a re-trained machine learning application. Also, the method 600 can include the network manager, at 606, determining the multiple layers of the neural network according to the re-training based on the current network video traffic. This can include determining the number of nodes in each layer as well as the interconnections among nodes between layers. Further, this can also include determining the weights of inputs to each node as well as the transfer function of each node. The method 600 can include the network manager, at 608, identifying one or more statistical states to include in at least one of the Markov logic state machines according to the current network video traffic. Further, the method 600 can include the network manager, at 610, determining the plurality of Markov logic state machines according to the current network video traffic. In addition, the method 600 can include the network manager, at 612, adjusting the at least one of the Markov logic state machines to include the one or more statistical states. Also, the method 600 can include the network manager, at 614, re-provisioning the network resources to route the current network video traffic according to the re-trained machine learning application.

Referring to FIG. 7, in one or more embodiments, the method 700 includes the network manager, at 702, receiving a predicted network video traffic. Further, the method 700 includes the network manager, at 704, identifying the predicted network video traffic does not conform to the historical network video traffic. In addition, the method 700 includes the network manager, at 706, re-training the machine learning application using the predicted network video traffic resulting in a re-trained machine learning application. Also, the method 700 includes the network manager, at 707, determining the plurality of layers of the neural network according to the re-training based on the predicted network video traffic.

The method 700 includes the network manager, at 708, identifying one or more statistical states to include in at least one of the Markov logic state machines according to the predicted network vide traffic. Further, the method 700 includes the network manager, at 710, determining the plurality of Markov logic state machines according to the predicted network video traffic. In addition, the method 700 includes the network manager, at 712, adjusting the at least one of the Markov logic state machines to include the one or more statistical states. Also, the method 700 includes the network manager, at 714, re-provisioning the network resources to route the current network video traffic according to the re-trained machine learning application.

While for purposes of simplicity of explanation, the respective processes are shown and described as a series of blocks in FIGS. 5-7, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Further, embodiments described herein and portions thereof can be combined with other embodiments or portioned thereof.

Figure 8A:
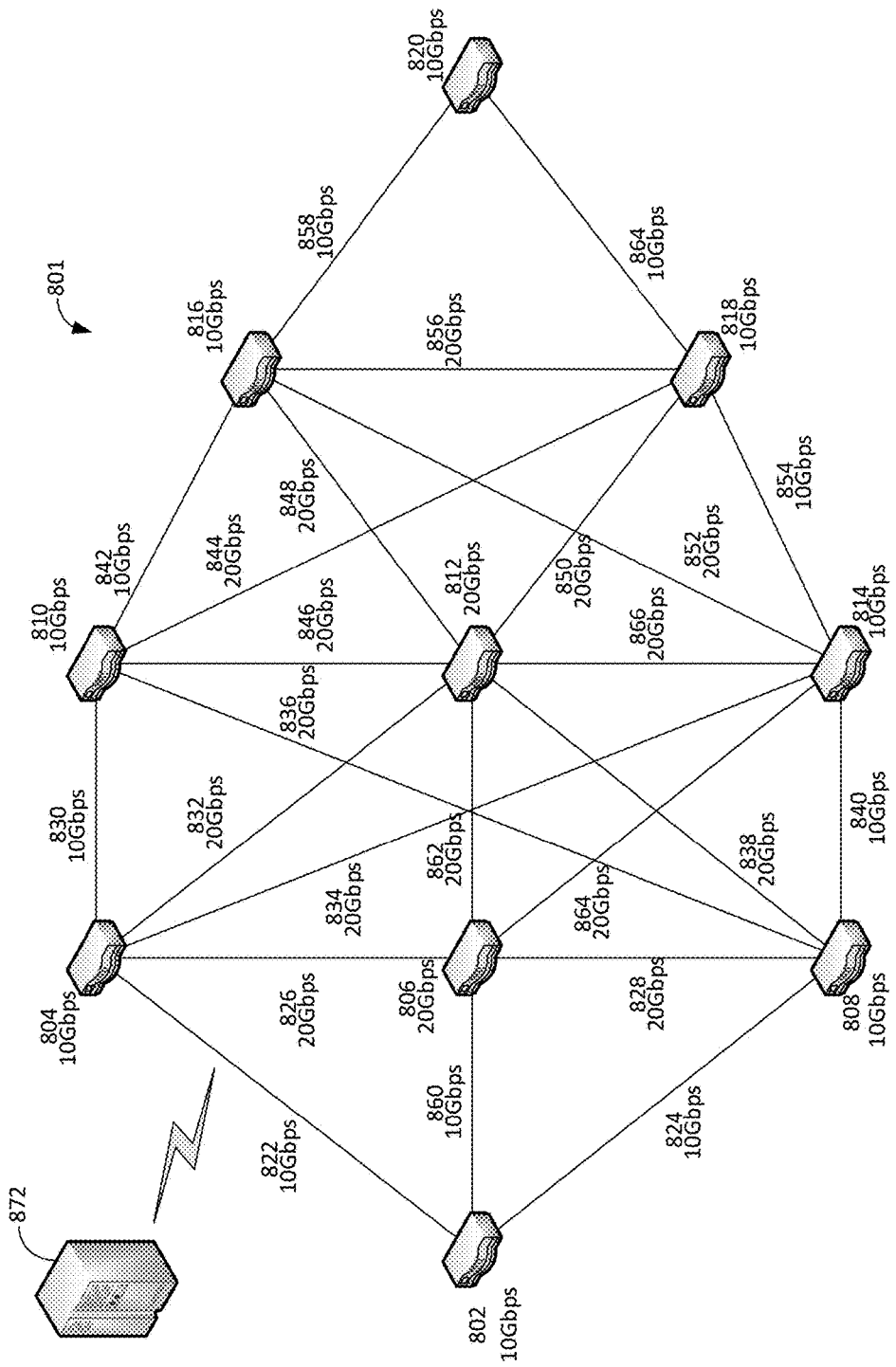
FIGS. 8A-8D and 9A-9B depict illustrative embodiments of using Riemannian geometry integrated with a game-theoretic approach to manage network video traffic.

FIGS. 8A-8D and 9A-9B depict illustrative embodiments of using Riemannian geometry integrated with a game-theoretic approach to manage network video traffic. Referring to FIG. 8A, in one or more embodiments, system 100 includes routers 802, 804, 808, 810, 812, 814, 816, 818, 820 communicatively coupled by communication links 822, 824, 826, 828, 830, 832, 834, 838, 840, 842, 844, 846, 848, 850, 852, 854, 856, 858, 860, 862, 864 within a communication network 801. A network manager 872 is communicatively coupled to the routers and communication links within the communication network 801. Further, the network manager 872 can include a network management application to allocate/provision the network resources (e.g. routers, processors, communication links, bandwidth, storage devices, memory, etc.)

In one or more embodiments, each router can comprise processing system including one or more processors. Some of the processors can be located within each router or distributed in remote locations among a distributed or cloud environment. Further, the network manager 872 can configure each router with processor capacity. That is, the network manager 872 can allocate/activate processors located within each router or remotely located. In addition, network manager 872 can configure each communication link with bandwidth capacity. For example, the communication link can be an optical communication link that can support multiple wavelengths of light, each carrying communications. The network manager 872 can configure each communication link to allocate more or less number of wavelengths to increase or decrease the bandwidth capacity.

In one or more embodiments, the network manager 872 can allocate one or more storage devices to each of the routers to store information regarding routing network video traffic or buffering network video traffic. Some of the storage devices can be located within each router or distributed in remote locations among a distributed or cloud environment.

In one or more embodiments, the network manager 872 observes network video traffic traversing the routers and communication links with the communication network 801. Further, the network manager 872 can allocate processing capacity to routers and bandwidth capacity to communication links to allow the communication network 801 to accommodate the network video traffic and deliver media content to end user devices (e.g. devices such as mobile devices, computers, wearable devices, etc. that are communicatively coupled to the routers) for an enjoyable user experience. Such as experience includes end user devices receiving high resolution media content with little or no delay. Further, the network manager 872 allocates network resources (e.g. routers, processor capacity, communication links, bandwidth capacity, storage devices, memory capacity, etc.) so that all end user devices receive high resolution media content with little or no delay as much as possible. That is, instead of focusing on the shortest path for individual video streams and allocating network resources along such a path, the network manager 872 can focus on allocating network resources for individual video streams throughout the communication network 801 to provide high resolution media content and little or no delay for all end user devices and their associated end user to have an enjoyable viewing experience.

In one or more embodiments, each network resources can be provisioned with a capacity by the network manager 872. For example, each router can be configured with the same or different processor capacities. In some embodiments, routers 802, 804, 808, 810, 814, 816, 818, 820 can be provisioned by the network manager 872 with a processor capacity of 10 Gbps. Further, routers 806, 812 can be provisioned by the network manager 872 with a processor capacity of 20 Gbps. In addition, communication links 822, 824, 860, 830, 840, 842, 854, 858, 864 can be provisioned by the network manager 872 with a bandwidth capacity of 10 Gbps. Also, communication links 826, 828, 862, 832, 834, 864, 838, 844, 846, 848, 850, 852, 866, 856 can be provisioned by the network manager 872 with a bandwidth capacity of 20 Gbps. In other embodiments, the network manager 872 cam provision the memory capacity associated with each of the routers.

In one or more embodiments, the network manager 872 receives training data to train its network management application. The training data comprises the historical states for each of the network resources (e.g. routers, communication links, storage devices, etc.) within communication network 801. A state for a network resource could be the current or historical capacity for the resource (e.g. processor capacity, memory capacity for a router and bandwidth capacity for a communication link) given historical network video traffic. The current/historical capacity may reflect an equilibrium state. Further, each network resource can be associated with a state machine (e.g. Markov logic state machine described herein) such that the states can include a negative or positive transition state or another equilibrium state. Further, the training data also includes the current or historical network video traffic for the communication network. The network manager 872 trains its network management application based on the training data including the current/historical states of each network resources as well as the current/historical network video traffic for the communication network 801.

In one or more embodiments, the network manager 872 using the network management application generates a Riemannian geometry or geometric shape of the communication network 801. Riemannian geometry may have multiple vertices, some of which are connected as edges by curved lines or arcs (e.g. geodesics) rather than straight lines. When modeling the communication network 801 as Riemannian geometry, each vertex can represent a type of network resource (e.g. router) and each edge can represent another type of network resource (e.g. communication link). Further, the current/historical states of the network resources are used to generate the Riemannian geometry.

Figure 8B:
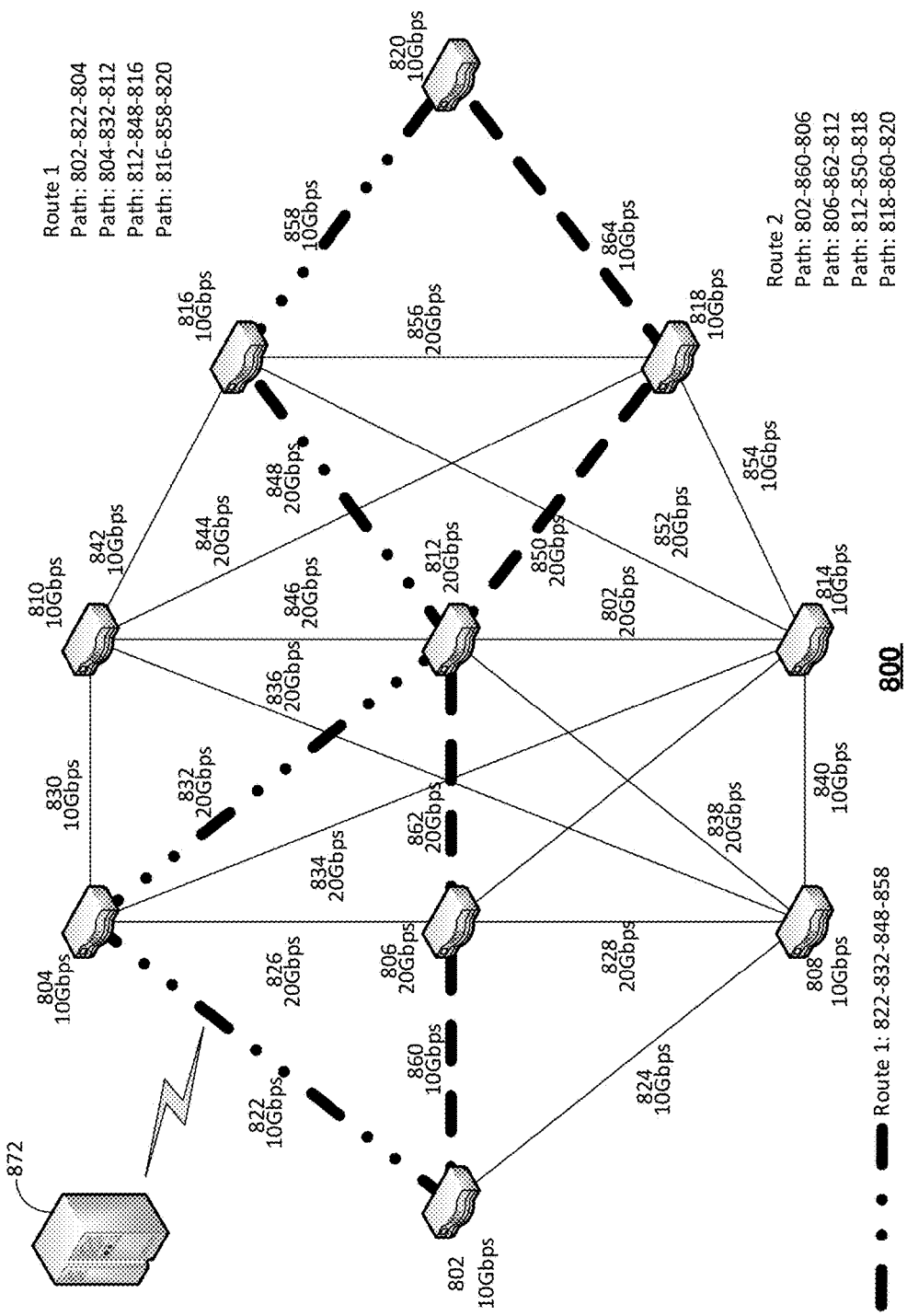

Referring to FIG. 8B, in one or more embodiments, the network manager 872 using a network management application can determine multiple paths long the communication network modeled as Riemannian geometry. In some embodiments, a first route can comprise several paths that traverses from router 802 to router 820 along communication links 822, 832, 848, 858. Further, a second route can comprise several paths from router 802 to 820 along communication links 860, 862, 850, 860. A path can be between one router to another router along a communication link. A first route between router 802 and router 820 can comprise several paths that include the path between router 802 and router 804 along communication link 822, the path between router 804 and router 812 along communication link 832, the path between router 812 and router 816 along communication link 848, and the path between router 816 and router 820 along communication link 858. A second route between router 802 and router 820 can comprise several paths that include the path between router 802 and router 806 along communication link 860, the path between router 806 and router 812 along communication link 862, the path between router 812 and router 818 along communication link 850, and the path between router 818 and router 820 along communication link 864.

Figure 8C:
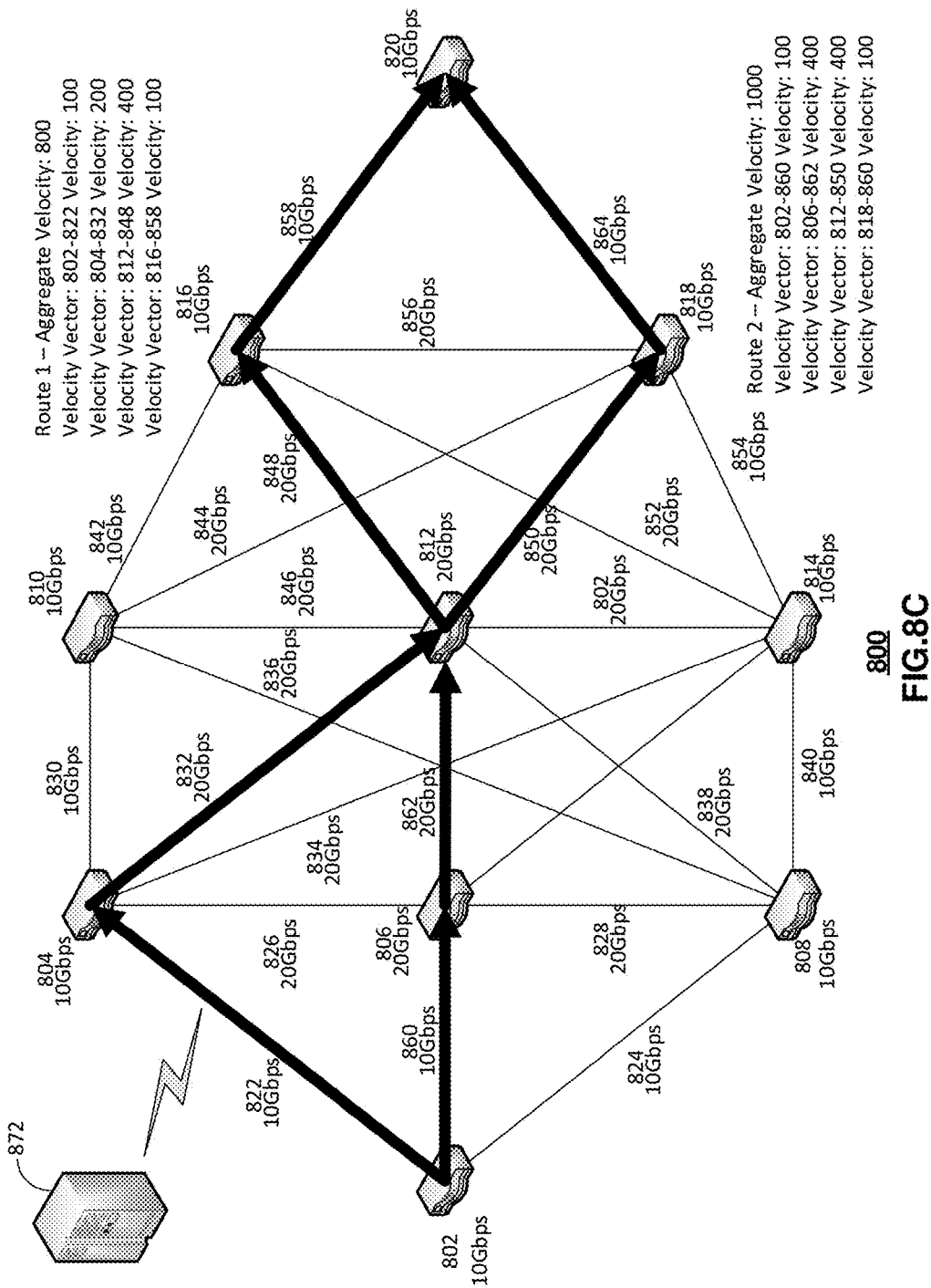

Referring to FIG. 8C, in one or more embodiments, the network manager 872 can determine a velocity vector for each path within a route. A velocity vector indicates the ability of the path to carry network video traffic in a particular direction. A velocity of a velocity vector can be determined according to the capacity of the different network resources along the path. For example, for a path between router 802 and 808 along communication link 824 can have a velocity vector from router 802 toward router 808. Further, the velocity of such a velocity vector can be the product of the processor capacity of router 802 and the bandwidth capacity of communication link 824. (If a memory capacity was associated with the router 802, then the velocity of the velocity vector can be the product of the processor capacity and the memory capacity of the router 802 with the bandwidth capacity of the communication link 824). Thus, the velocity of such a velocity vector can be 100.

In one or more embodiments, the network manager 872 can determine a velocity of each path comprising a first route and a second route (or any number of routes; a route comprises multiple paths).

For example, a first route comprises several velocity vectors that include a velocity vector from router 802 along communication link 822, a velocity vector from router 804 along communication link 832, a velocity vector from router 812 along communication link 848, and a velocity vector from router 816 along communication link 852. The velocity for the velocity vector from router 802 along communication link 822 is 100. The velocity for the velocity vector from router 804 along communication link 832 is 200. The velocity for the velocity vector from router 812 along communication link 848 is 400. The velocity for the velocity vector from router 816 along communication link 858 is 100. The aggregate velocity for the velocity vectors comprising the first route is 800.

In another example, a second route comprises several velocity vectors that include a velocity vector from router 802 along communication link 860, a velocity vector from router 806 along communication link 862, a velocity vector from router 812 along communication link 850, and a velocity vector from router 818 along communication link 864. The velocity for the velocity vector from router 802 along communication link 860 is 100. The velocity for the velocity vector from router 806 along communication link 862 is 400. The velocity for the velocity vector from router 812 along communication link 850 is 400. The velocity for the velocity vector from router 818 along communication link 860 is 100. The aggregate velocity for the velocity vectors comprising the first route is 1000.

In one or more embodiments, the network manager 872, using a network management application, can determine the aggregate velocity of the velocity vectors from the first route and the aggregate velocity of the velocity vectors from the second route. Further, the network manager 872 determine the aggregate velocity for the second route is more than the aggregate velocity for the first route. Thus, the second route has more network resources to carry network video traffic across communication network 801. Therefore, the network manager 872, using the network management application, can identify the velocity vectors comprising the second route. This may include generating a sub-geometry with the Riemannian geometry representing the communication network 801. Further, the network manager 872, using the network management application, can provision a portion of the network resources according to the velocity vectors of the second route and the sub-geometry.

In one or more embodiments, the network manager 872, using the network management application can calculate the aggregate velocity of the velocity vectors of the second route. Further, the aggregate velocity can be above a predetermined threshold (e.g. 900). Thus, the second route has enough network resources to carry network video traffic across communication network 801 as determined to have an aggregate velocity above the predetermined threshold (the predetermined threshold can be identified as a metric that is the minimum, optimal or satisfactory aggregate velocity for a route between router 802 and router 820 of communication network 801 to carry network video traffic at a high resolution with little or no delay, for example). Therefore, the network manager 872, using the network management application, can identify the velocity vectors comprising the second route, accordingly. This may include generating a sub-geometry with the Riemannian geometry representing the communication network 801. Further, the network manager 872, using the network management application, provision a portion of the network resources according to the velocity vectors of the second route and the sub-geometry.

In one or more embodiments, the network manager 872, using the network management application, identifies the paths of each route using a game theoretic approach. That is, the game theoretic approach can identify paths along the non-linear (curved) Riemannian geometry that can optimize or provide alternate paths that provide better user experience to all end user device communicatively coupled to the routers of communication network 801 rather than identifying paths that provide a good experience for a particular end user device at the cost of providing a bad user experience to other end user devices.

Figure 8D:
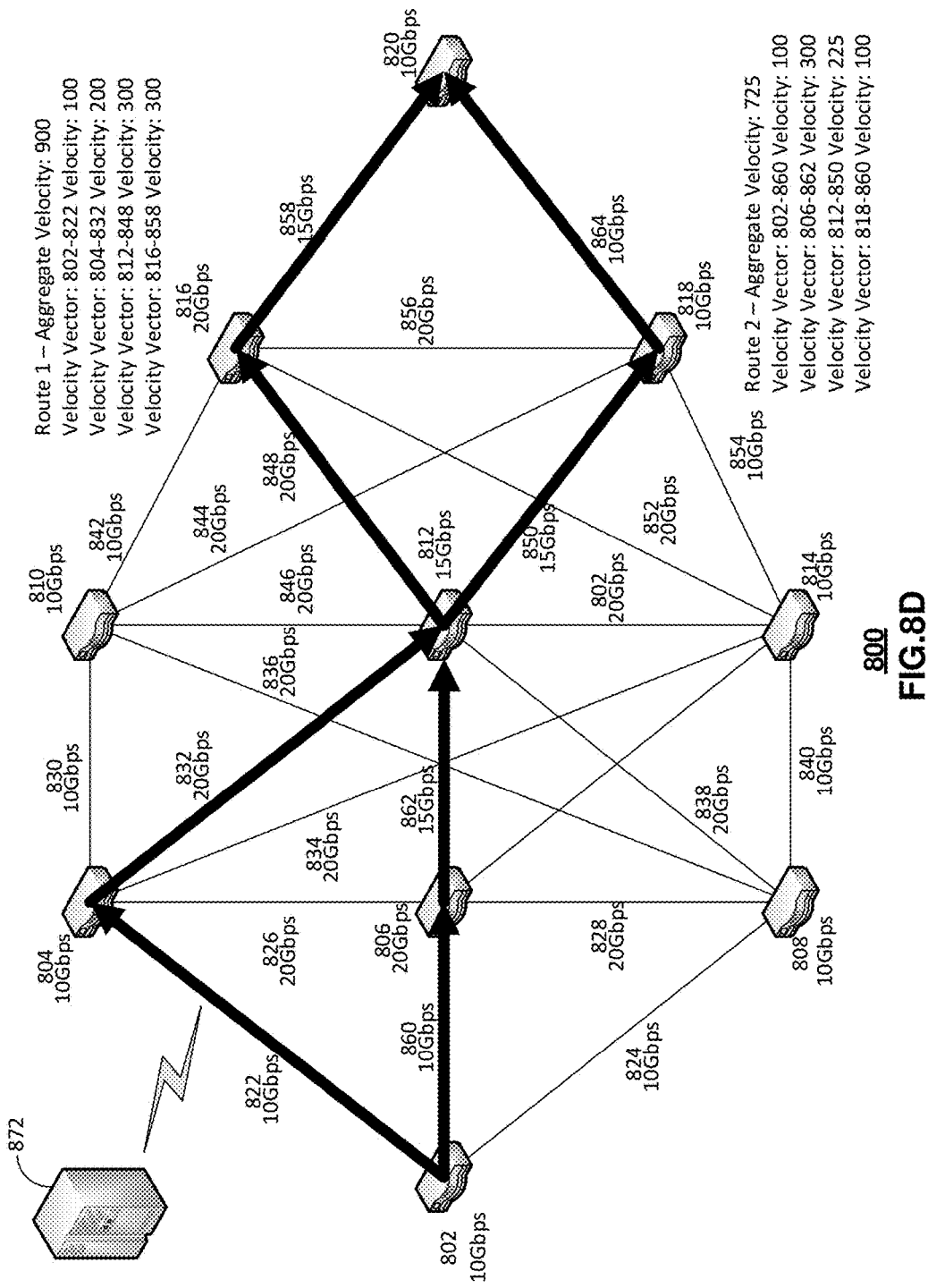

Referring to FIG. 8D, in one or more embodiments, once the network manager 872, using the network management application, provisions network resources according to the aggregate velocity, velocity vectors of the second route, and the sub-geometry, the capacity of network resources can be dynamic. Thus, as the network video traffic traverses across the communication network 801 and as the network video traffic changes or is different than the historical network video traffic used in developing the training data, the capacity of some or all of the network resources can change. Thus, the current states for each of the network resources can also change. The network manager 872, using the network management application, can monitor the current states for each of the network resources. Further, the network manager 872, using the network management application, calculates a current aggregate velocity of the velocity vectors of the second route, for example. In addition, the network manager 872, using the network management application, identifies a model error according to the current aggregate velocity for the second route and the previous aggregate velocity for the second route calculated using training data. For example, the current aggregate velocity of the velocity vectors for the second route can now be 725 as opposed to 1000 (See FIG. 8C). This may be due to communication link 862 decreasing its bandwidth capacity from router 806 toward router 812. Such decrease in bandwidth capacity may be that network video traffic from router 812 toward router 806 has increased and the bandwidth capacity of communication link 822 was dynamically allocated in this direction. Bandwidth capacity of communication link 850 may have been similarly, dynamically adjusted. Further, processor capacity of router 812 may have been dynamically decreased due to processor capacity need for functions other than routing network video traffic (e.g. public safety, etc.).

In one or more embodiments, the network manager 872, using the network management application, can determine the mode error is above a tolerance (e.g. 100). When the model error is above the tolerance (e.g. a threshold of 100), the network manager 872, using the network management application, can generate another Riemannian geometry of communication network 801 according to the current state of the network resources. Further, the network manager, using the network management application, determines paths along the other Riemannian geometry for another route (e.g. route 1) from router 802 to router 820, the velocity vector of each path and can determine a current aggregate velocity for the velocity vectors for the other route. Another sub geometry can be generated by the network manager 872 using the network management application. The velocity vectors for the other route are identified and the current aggregate velocity of the first route is compared with the aggregate velocity of the second route. The network manager, using the network management application provisions the network resources along the first route because its current aggregate velocity is now lower than the current aggregate velocity of the second route. The provisioning is done according to the velocity vectors of the first route and the corresponding sub-geometry. The current aggregate velocity of the first route changed due to a change in processor capacity of router 816 and bandwidth capacity of communication link 858. Processor capacity of router 816 may have been increased due to some of its processors that were used for other functions can now be used to route network video traffic. Bandwidth capacity of communication link 858 may have increased from router 816 toward 820 due to traffic from router 820 toward router 816 has decreased.

Figure 9A:
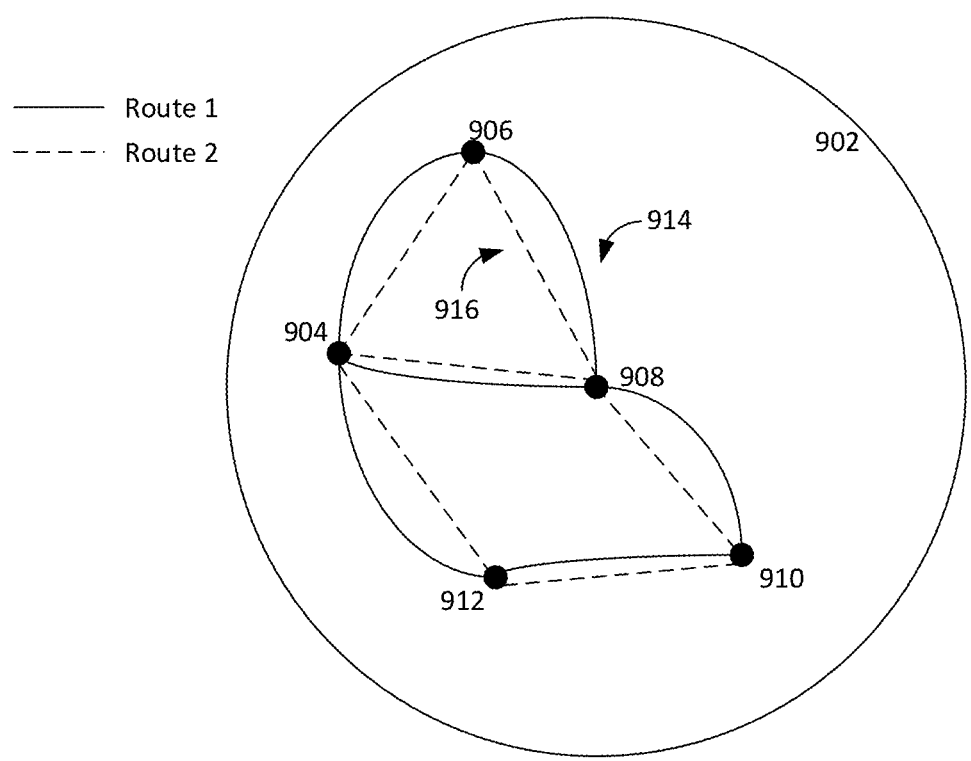

Referring to FIG. 9A, in one or more embodiments, a Riemannian geometry 902 of a communication network is shown. Further, the Riemannian geometry is a spherical shape. Further, there may be network resources 904, 906, 908, 910, 912 represented in the Riemannian geometry 902. The network resources 904, 906, 908, 910, 912 can represent processor capacity of routers. Other network resources represented in the Riemannian geometry 902 can bandwidth capacity of different communication links between the routers 904, 906, 908, 910, 912.

In one or more embodiments, a network manager using a network management application can identify paths of different routes, identify the velocity vectors of each path, identifying a group of velocity vectors associated with a route, and provisioning the network resources, as described herein. Further, the identified group of velocity vectors generate a sub-geometry 914. Note, the network manager identifies a non-linear, Riemannian sub-geometry (or geometric shape) as opposed to a linear sub-geometric shape 916 (e.g., the triangular and parallelogram geometric shapes). End user devices receive network video traffic across the communication network are communicatively coupled to the network resources. Linear sub-geometry can provide a good experience to a particular end user device at the expense to the experiences of other end user devices. The non-linear, Riemannian sub-geometry 914 optimizes, balances or provides a good experience for all the end user devices.

Figure 9B:
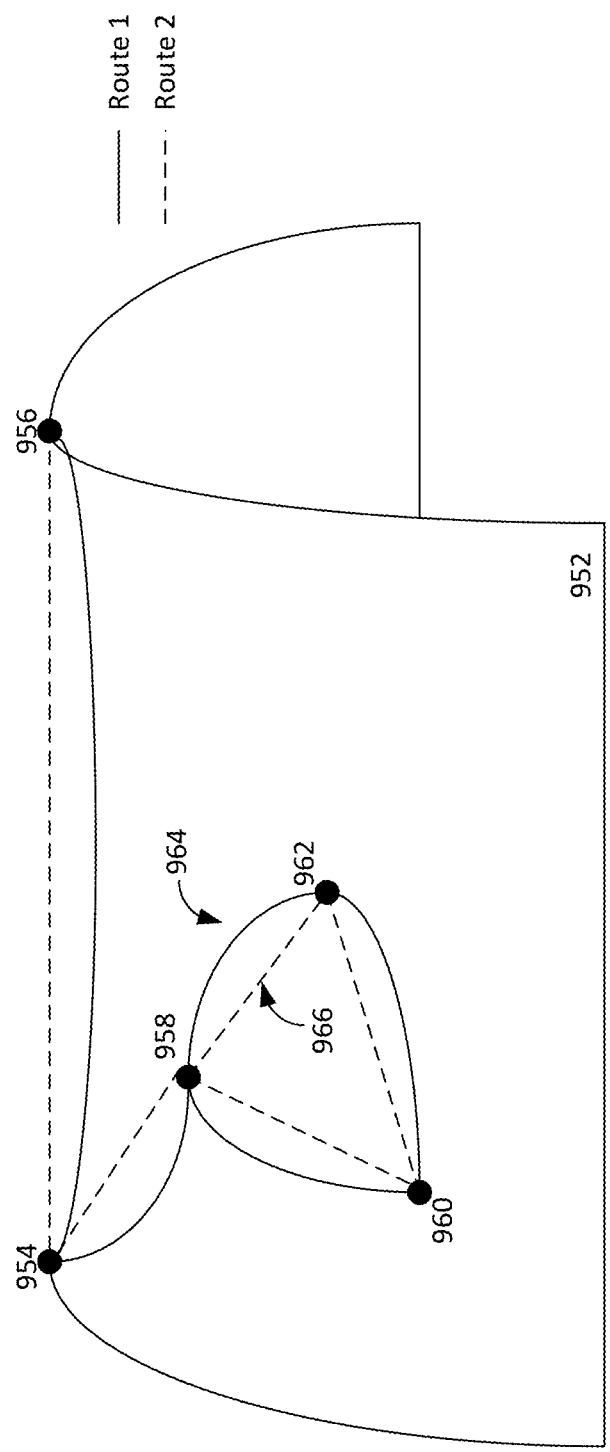

Referring to FIG. 9B, in one or more embodiments, a Riemannian geometry 952 of a communication network is shown. Further, the Riemannian geometry is a saddle shape. Further, there may be network resources 954, 956, 958, 960, 962 represented in the Riemannian geometry 952. The network resources 954, 956, 958, 960, 962 can represent processor capacity of routers. Other network resources represented in the Riemannian geometry 952 can bandwidth capacity of different communication links between the routers 954, 956, 958, 960, 962.

In one or more embodiments, a network manager using a network management application can identify paths of different routes, identify the velocity vectors of each path, identifying a group of velocity vectors associated with a route, and provisioning the network resources, as described herein. Further, the identified group of velocity vectors generate a sub-geometry 964. Note, the network manager identifies a non-linear, Riemannian sub-geometry (or geometric shape) as opposed to a linear sub-geometric shape 966 (e.g., the triangular and parallelogram geometric shapes). End user devices receive network video traffic across the communication network are communicatively coupled to the network resources. Linear sub-geometry can provide a good experience to a particular end user device at the expense to the experiences of other end user devices. The non-linear, Riemannian sub-geometry 964 optimizes, balances or provides a good experience for all the end user devices.

Note, the curved lines between the network resources 904, 906, 908, 910, 912, 954, 956, 958, 960, 962 can be geodesics as well as curved lines on any three-dimensional, curved surface.

Figure 10:
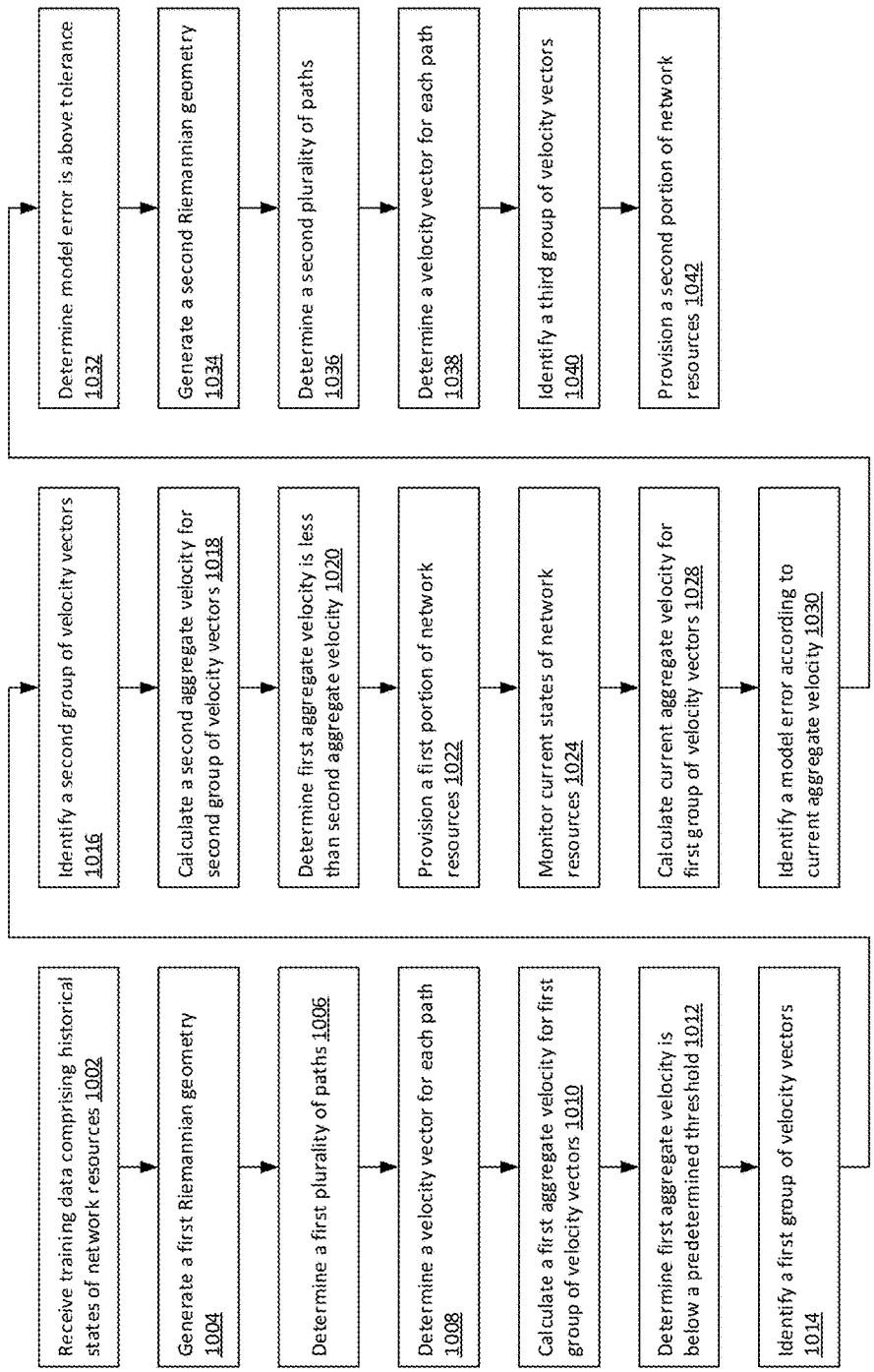
FIG. 10 depicts illustrative embodiments of methods used in portions of the systems described in FIGS. 8A-8C and 9A-9B.

FIG. 10 depicts illustrative embodiments of methods used in portions of the systems described in FIGS. 8A-8C and 9A-9B. In one or more embodiments, the method 1000 can be implemented a network manager, described herein, using a network management application. The method 1000 includes the network manager, at 1002, receiving training data comprising multiple historical states for each of a multiple network resources of a communication network. Further, the method 1000 includes the network manager, at 1004, generating a first Riemannian geometry of the communication network according to the multiple historical states for each of the multiple network resources. Each of the multiple network resources can be a vertex or an edge within the first Riemannian geometry. In addition, the method 1000 includes the network manager, at 1006, determining a first plurality of paths along the first Riemannian geometry. The first plurality of paths can be a route between one network node (e.g. router, end user device, etc.) and another network node. Each path in the first plurality of paths comprises at least one of the multiple network resources.

Also, the method 1000 includes the network manager, at 1008, determining a velocity vector of each path of the first plurality of paths according to at least one state of the multiple historical states. The method 1000 includes the network manager, at 1010, calculating a first aggregate velocity for the first group of velocity vectors according to the velocity associated with each velocity vector of the first group of velocity vectors. Further, the method 1000 includes the network manager, at 1012, determining the first aggregate velocity is above a predetermined threshold. In addition, the method 1000 includes the network manager, at 1014, identifying a first group of velocity vectors that generate a first sub-geometry within the first Riemannian geometry.

Also, the method 1000 includes the network manager, at 1016, identifying a second group of velocity vectors that generate a second sub-geometry within the first Riemannian geometry. Each velocity vector of the first group of velocity vectors and the second group of velocity vectors is associated with a velocity. The method 1000 includes the network manager, at 1018, calculating a second aggregate velocity for the second group of velocity vectors according to the velocity associated with each velocity vector of the second group of velocity vectors. Further, the method 1000 includes the network manager, at 1020 determining the first aggregate velocity is lower than the second aggregate velocity. In addition, the method 1000 includes the network manager, at 1022, provisioning a first portion of the plurality of network resources according to the first group of velocity vectors and the first sub-geometry.

Each velocity vector is associated with a velocity. Further, a velocity vector can represent one of processor capacity, bandwidth capacity, and storage capacity. Further identifying the paths and/or velocity vectors can be done by implementing a game-theoretic approach.

The method 1000 can include the network manager, at 1024, monitoring a plurality of current states for each of the multiple network resources in the communication network. Further, the method 1000 can include the network manager, at 1028, calculating a current aggregate velocity for the first group of velocity vectors according to the multiple current states. In addition, method 1000 can include the network manager, at 1030, identifying a model error according to the current aggregate velocity and a first aggregate velocity. Also, the method 1000 can include the network manager, at 1032 determining the model error is above a tolerance.

The method 1000 can include the network manager, at 1034, generating a second Riemannian geometry of the communication network according to the multiple current states for each of the multiple network resources. Each of the plurality of network resources can be a vertex or an edge within the second Riemannian geometry. Further, method 1000 can include the network manager, at 1036, determining a second plurality of paths along the second Riemannian geometry. Each path in the second plurality of paths comprises at least one of the multiple network resources. In addition, the method 1000 can include the network manager, at 1038, determining a velocity vector of each path of the second plurality of paths according to at least one state of the multiple current states. Also, the method 1000 can include the network manager, at 1040, identifying a third group of velocity vectors that generate a third sub-geometry within the second Riemann geometry. The method 1000 can include the network manager, at 1042, provisioning a second portion of the multiple network resources according to the third group of velocity vectors and the third sub-geometry.

While for purposes of simplicity of explanation, the respective processes are shown and described as a series of blocks in FIG. 10, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 11:
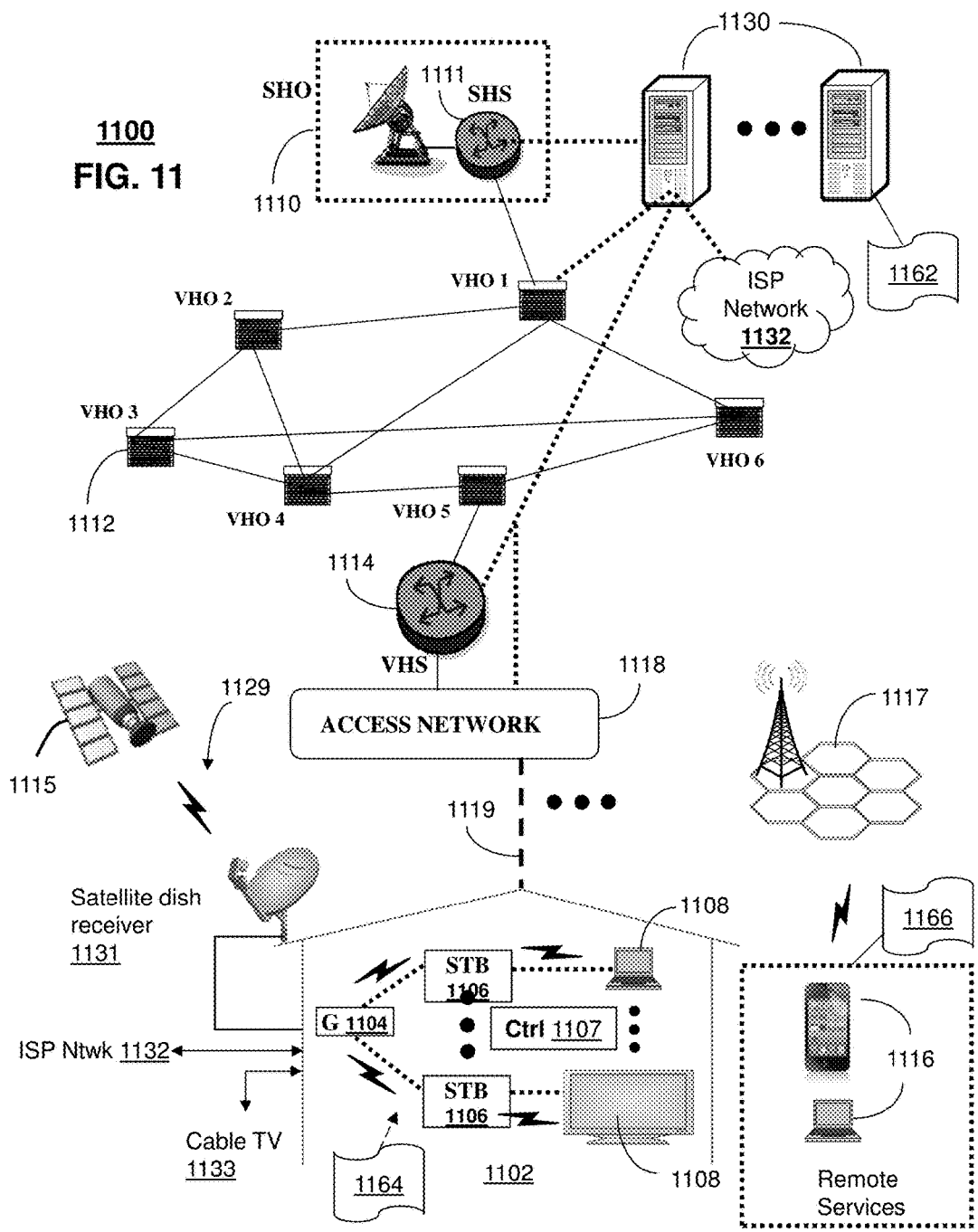
FIGS. 11-12 depict illustrative embodiments of communication systems that provide media management services.

FIG. 11 depicts an illustrative embodiment of a communication system 1100 for providing various communication services, such as delivering media content. The communication system 1100 can represent an interactive media network, such as an interactive television system (e.g., an Internet Protocol Television (IPTV) media system). Communication system 1100 can be overlaid or operably coupled with to systems 100, 300, 400, 800, 900, 950 of FIGS. 1, 3, 4, 8A-8D and 9A-9B as another representative embodiment of communication system 1100. For instance, one or more devices illustrated in the communication system 1100 of FIG. 11 such as network manager 1130 can receive training data comprising a plurality of historical states for each of a plurality of network resources of a communication network. Further, the network manager 1130 can generate a first Riemannian geometry of the communication network according to the plurality of historical states for each of the plurality of network resources. Each of the plurality of network resources is one of a vertex or an edge within the first Riemannian geometry. In addition, the network manager can 1130 determine a first plurality of paths along the first Riemannian geometry. Each path in the first plurality of paths comprises at least one of the plurality of network resources. Also, the network manager 1130 can determine a velocity vector of each path of the first plurality of paths according to at least one state of the plurality of historical states. The network manager 1130 can identify a first group of velocity vectors that generate a first sub-geometry within the first Riemannian geometry. Further, the network manager 1130 can provision a first portion of the plurality of network resources according to the first group of velocity vectors and the first sub-geometry.

In one or more embodiments, the communication system 1100 can include a super head-end office (SHO) 1110 with at least one super headend office server (SHS) 1111 which receives media content from satellite and/or terrestrial communication systems. In the present context, media content can represent, for example, audio content, moving image content such as 2D or 3D videos, video games, virtual reality content, still image content, and combinations thereof. The SHS server 1111 can forward packets associated with the media content to one or more video head-end servers (VHS) 1114 via a network of video head-end offices (VHO) 1112 according to a multicast communication protocol. The VHS 1114 can distribute multimedia broadcast content via an access network 1118 to commercial and/or residential buildings 1102 housing a gateway 1104 (such as a residential or commercial gateway).

The access network 1118 can represent a group of digital subscriber line access multiplexers (DSLAMs) located in a central office or a service area interface that provide broadband services over fiber optical links or copper twisted pairs 1119 to buildings 1102. The gateway 1104 can use communication technology to distribute broadcast signals to media processors 1106 such as Set-Top Boxes (STBs) which in turn present broadcast channels to media devices 1108 such as computers or television sets managed in some instances by a media controller 1107 (such as an infrared or RF remote controller).

The gateway 1104, the media processors 1106, and media devices 1108 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1106 and subsystems of the IPTV media system for services such as video-on-demand (VoD), browsing an electronic programming guide (EPG), or other infrastructure services.

A satellite broadcast television system 1129 can be used in the media system of FIG. 11. The satellite broadcast television system can be overlaid, operably coupled with, or replace the IPTV system as another representative embodiment of communication system 1100. In this embodiment, signals transmitted by a satellite 1115 that include media content can be received by a satellite dish receiver 1131 coupled to the building 1102. Modulated signals received by the satellite dish receiver 1131 can be transferred to the media processors 1106 for demodulating, decoding, encoding, and/or distributing broadcast channels to the media devices 1108. The media processors 1106 can be equipped with a broadband port to an Internet Service Provider (ISP) network 1132 to enable interactive services such as VoD and EPG as described above.

In yet another embodiment, an analog or digital cable broadcast distribution system such as cable TV system 1133 can be overlaid, operably coupled with, or replace the IPTV system and/or the satellite TV system as another representative embodiment of communication system 1100. In this embodiment, the cable TV system 1133 can also provide Internet, telephony, and interactive media services. System 1100 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1130, a portion of which can operate as a web server for providing web portal services over the ISP network 1132 to wireline media devices 1108 or wireless communication devices 1116.

Multiple forms of media services can be offered to media devices over landline technologies such as those described above. Additionally, media services can be offered to media devices by way of a wireless access base station 1117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 12:
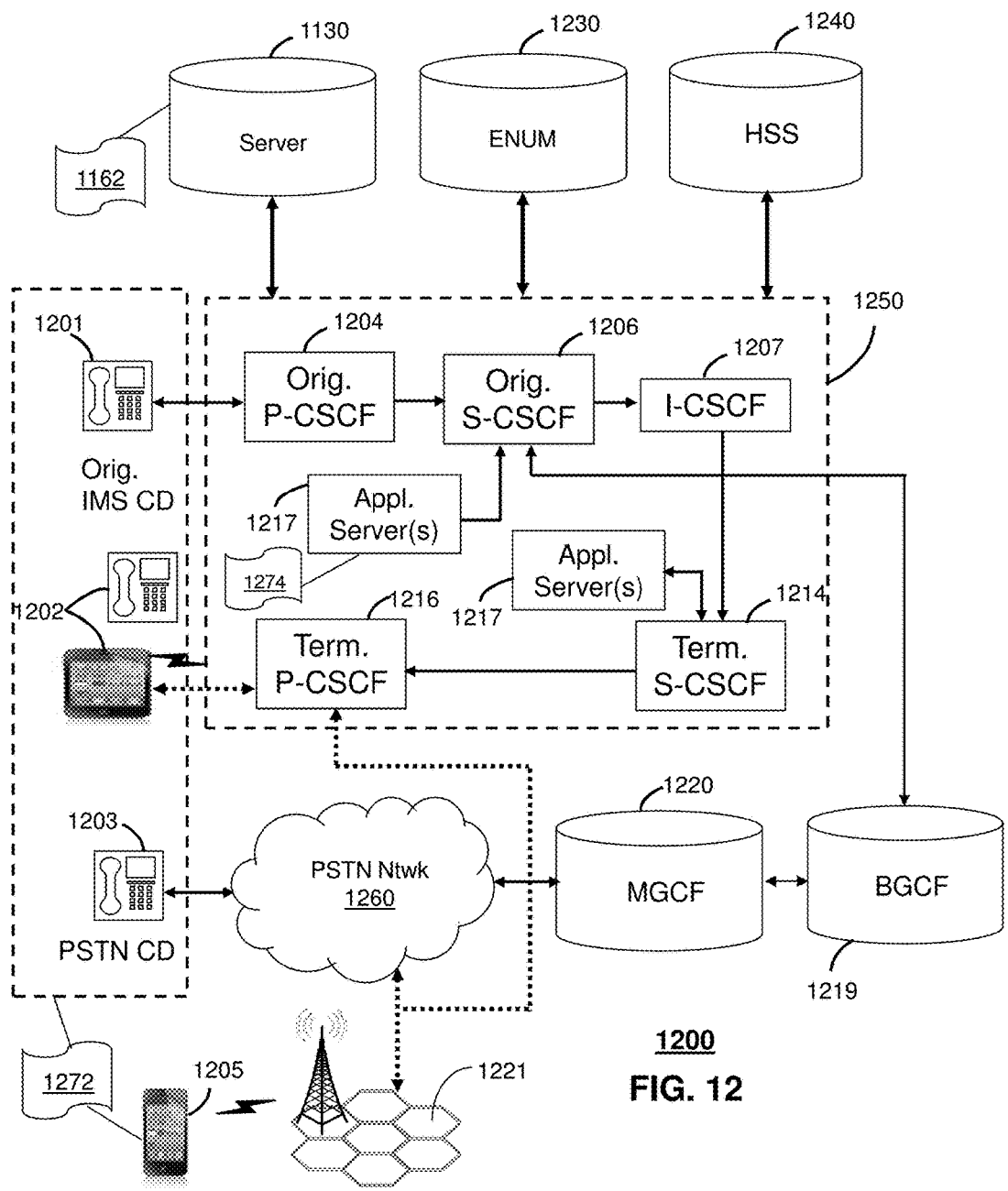

FIG. 12 depicts an illustrative embodiment of a communication system 1200 employing an IP Multimedia Subsystem (IMS) network architecture to facilitate the combined services of circuit-switched and packet-switched systems. Communication system 1200 can be overlaid or operably coupled with systems 100, 300, 400, 800, 900, 950 of FIGS. 1, 3-4, 8A-8D, and 9A-9B and communication system 1100 as another representative embodiment of communication system 1100. The network manager 1130 can monitor a plurality of current states for each of a plurality of network resources in a communication network. Further, the network manager 1130 can calculate a current aggregate velocity for a first group of velocity vectors according to the plurality of current states. In addition, the network manager 1130 can identify a model error according to the current aggregate velocity and a first aggregate velocity. The first aggregate velocity is for the first group of velocity vectors according to a plurality of historical states for each of the plurality of network resources. Also, the network manager can determine the model error is above a tolerance.

Communication system 1200 can comprise a Home Subscriber Server (HSS) 1240, a tElephone NUmber Mapping (ENUM) server 1230, and other network elements of an IMS network 1250. The IMS network 1250 can establish communications between IMS-compliant communication devices (CDs) 1201, 1202, Public Switched Telephone Network (PSTN) CDs 1203, 1205, and combinations thereof by way of a Media Gateway Control Function (MGCF) 1220 coupled to a PSTN network 1260. The MGCF 1220 need not be used when a communication session involves IMS CD to IMS CD communications. A communication session involving at least one PSTN CD may utilize the MGCF 1220.

IMS CDs 1201, 1202 can register with the IMS network 1250 by contacting a Proxy Call Session Control Function (P-CSCF) which communicates with an interrogating CSCF (I-CSCF), which in turn, communicates with a Serving CSCF (S-CSCF) to register the CDs with the HSS 1240. To initiate a communication session between CDs, an originating IMS CD 1201 can submit a Session Initiation Protocol (SIP INVITE) message to an originating P-CSCF 1204 which communicates with a corresponding originating S-CSCF 1206. The originating S-CSCF 1206 can submit the SIP INVITE message to one or more application servers (ASs) 1217 that can provide a variety of services to IMS subscribers.

For example, the application servers 1217 can be used to perform originating call feature treatment functions on the calling party number received by the originating S-CSCF 1206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1206 can submit queries to the ENUM system 1230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1207 to submit a query to the HSS 1240 to identify a terminating S-CSCF 1214 associated with a terminating IMS CD such as reference 1202. Once identified, the I-CSCF 1207 can submit the SIP INVITE message to the terminating S-CSCF 1214. The terminating S-CSCF 1214 can then identify a terminating P-CSCF 1216 associated with the terminating CD 1202. The P-CSCF 1216 may then signal the CD 1202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 12 may be interchangeable. It is further noted that communication system 1200 can be adapted to support video conferencing. In addition, communication system 1200 can be adapted to provide the IMS CDs 1201, 1202 with the multimedia and Internet services of communication system 1100 of FIG. 11.

If the terminating communication device is instead a PSTN CD such as CD 1203 or CD 1205 (in instances where the cellular phone only supports circuit-switched voice communications), the ENUM system 1230 can respond with an unsuccessful address resolution which can cause the originating S-CSCF 1206 to forward the call to the MGCF 1220 via a Breakout Gateway Control Function (BGCF) 1219. The MGCF 1220 can then initiate the call to the terminating PSTN CD over the PSTN network 1260 to enable the calling and called parties to engage in voice and/or data communications.

It is further appreciated that the CDs of FIG. 12 can operate as wireline or wireless devices. For example, the CDs of FIG. 12 can be communicatively coupled to a cellular base station 1221, a femtocell, a WiFi router, a Digital Enhanced Cordless Telecommunications (DECT) base unit, or another suitable wireless access unit to establish communications with the IMS network 1250 of FIG. 12. The cellular access base station 1221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 12.

Cellular phones supporting LTE can support packet-switched voice and packet-switched data communications and thus may operate as IMS-compliant mobile devices. In this embodiment, the cellular base station 1221 may communicate directly with the IMS network 1250 as shown by the arrow connecting the cellular base station 1221 and the P-CSCF 1216.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network manager 1130 of FIG. 11 can be operably coupled to communication system 1200 for purposes similar to those described above. Network manager 1130 can perform function 1162 (e.g. network management application) and thereby provide network video management services to the CDs 1201, 1202, 1203 and 1205 of FIG. 12 similar to the functions described for network manager of FIGS. 1, 3, 4, and 8A-8D in accordance with methods 500, 600, 700, 1000 of FIGS. 5-7, and 19. CDs 1201, 1202, 1203 and 1205, which can be adapted with software to perform function 1272 to utilize the services of the network manager 1130.

Network manager 1130 can be an integral part of the application server(s) 1217 performing function 1272, which can be substantially similar to function 1162 and adapted to the operations of the IMS network 1250.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 13:
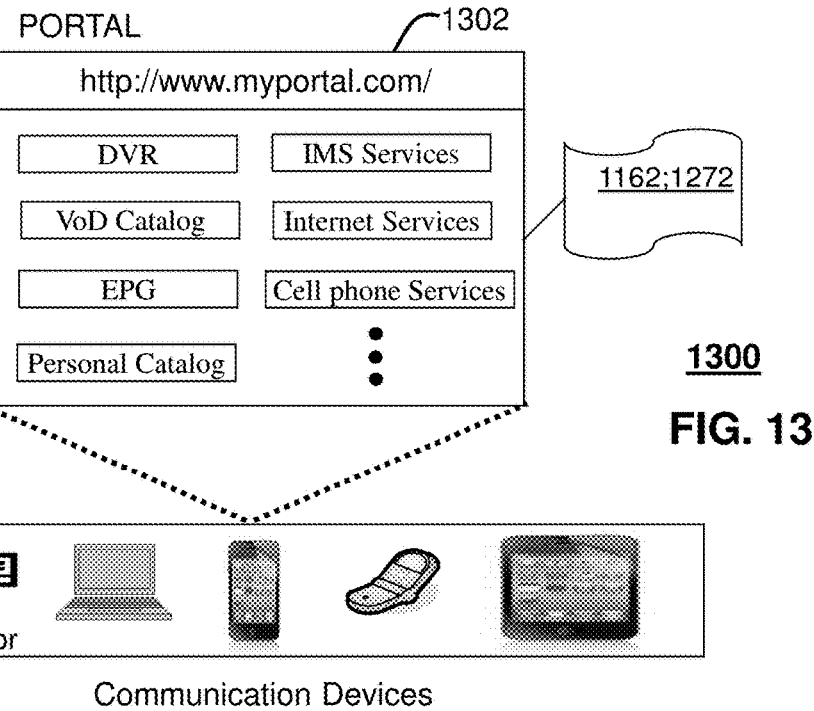
FIG. 13 depicts an illustrative embodiment of a web portal for interacting with the communication systems of providing and managing media services.

FIG. 13 depicts an illustrative embodiment of a web portal 1302 of a communication system 1300. Communication system 1300 can be overlaid or operably coupled with systems 100, 300, 400, 800, 900, 950 of FIGS. 1, 3-4, 8A-8D, and 9A-9B, communication system 1100, and/or communication system 1200 as another representative embodiment of 100, 300, 400, 800, 900, 950 of FIGS. 1, 3-4, 8A-8D, and 9A-9B, communication system 1100, and/or communication system 1200. The web portal 1302 can be used for managing services of 100, 300, 400, 800, 900, 950 of FIGS. 1, 3-4, 8A-8D, and 9A-9B and communication systems 1100-1200. A web page of the web portal 1302 can be accessed by a Uniform Resource Locator (URL) with an Internet browser using an Internet-capable communication device such as those described in FIGS. 1 3-4, 8A-8D, and 9A-9B and FIGS. 11-12. The web portal 1302 can be configured, for example, to access a media processor 1106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1106. The web portal 1302 can also be used for provisioning IMS services described earlier, provisioning Internet services, provisioning cellular phone services, and so on.

The web portal 1302 can further be utilized to manage and provision software applications 1162 and 1272 to adapt these applications as may be desired by subscribers and/or service providers of 100, 300, 400, 800, 900, 950 of FIGS. 1, 3-4, 8A-8D, and 9A-9B, and communication systems 1100-1200. For instance, users of the services provided network manager 1130 can log into their on-line accounts and provision network manager 1130 with training data to be used by the network management application 1162. Service providers can log onto an administrator account to provision, monitor and/or maintain the 100, 300, 400, 800, 900, 950 of FIGS. 1, 3-4, 8A-8D, and 9A-9B or server 1130.

Figure 14:
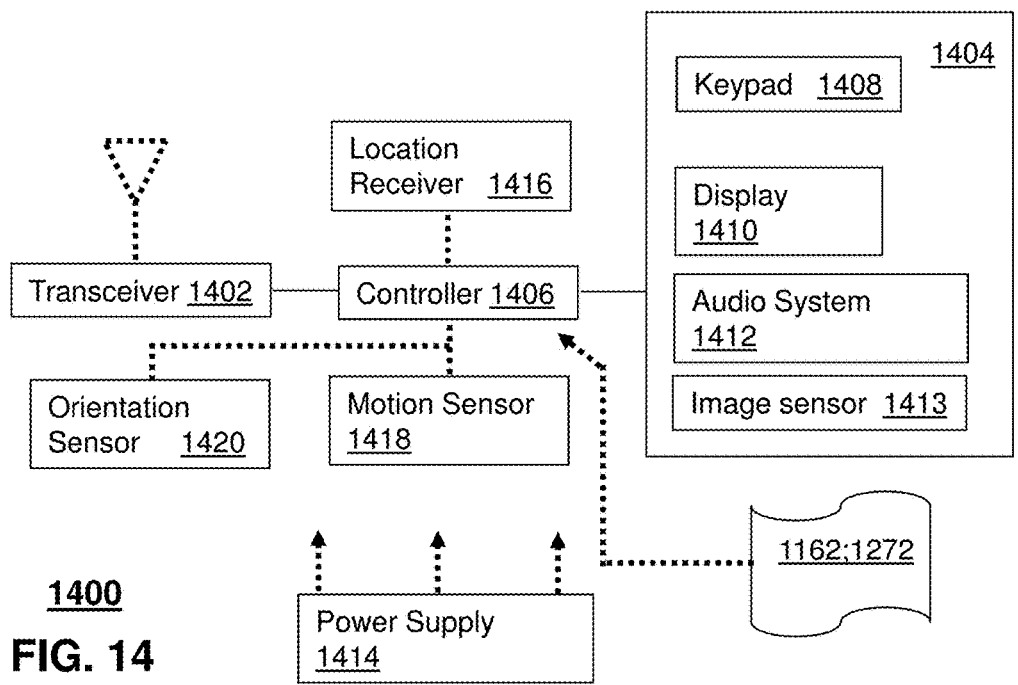
FIG. 14 depicts an illustrative embodiment of a communication device.

FIG. 14 depicts an illustrative embodiment of a communication device 1400. Communication device 1400 can serve in whole or in part as an illustrative embodiment of the devices depicted in FIGS. 1, 3-4, 8A-8D, and 9A-9B, and FIGS. 11-12 and can be configured to perform portions of methods 500, 600, 700, and 1000 of FIGS. 5-7 and 10.

Communication device 1400 can comprise a wireline and/or wireless transceiver 1402 (herein transceiver 1402), a user interface (UI) 1404, a power supply 1414, a location receiver 1416, a motion sensor 1418, an orientation sensor 1420, and a controller 1406 for managing operations thereof. The transceiver 1402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1402 can also be adapted to support circuit-switched wireline access technologies (such as PSTN), packet-switched wireline access technologies (such as TCP/IP, VoIP, etc.), and combinations thereof.

The UI 1404 can include a depressible or touch-sensitive keypad 1408 with a navigation mechanism such as a roller ball, a joystick, a mouse, or a navigation disk for manipulating operations of the communication device 1400. The keypad 1408 can be an integral part of a housing assembly of the communication device 1400 or an independent device operably coupled thereto by a tethered wireline interface (such as a USB cable) or a wireless interface supporting for example Bluetooth®. The keypad 1408 can represent a numeric keypad commonly used by phones, and/or a QWERTY keypad with alphanumeric keys. The UI 1404 can further include a display 1410 such as monochrome or color LCD (Liquid Crystal Display), OLED (Organic Light Emitting Diode) or other suitable display technology for conveying images to an end user of the communication device 1400. In an embodiment where the display 1410 is touch-sensitive, a portion or all of the keypad 1408 can be presented by way of the display 1410 with navigation features.

The display 1410 can use touch screen technology to also serve as a user interface for detecting user input. As a touch screen display, the communication device 1400 can be adapted to present a user interface with graphical user interface (GUI) elements that can be selected by a user with a touch of a finger. The touch screen display 1410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1410 can be an integral part of the housing assembly of the communication device 1400 or an independent device communicatively coupled thereto by a tethered wireline interface (such as a cable) or a wireless interface.

The UI 1404 can also include an audio system 1412 that utilizes audio technology for conveying low volume audio (such as audio heard in proximity of a human ear) and high volume audio (such as speakerphone for hands free operation). The audio system 1412 can further include a microphone for receiving audible signals of an end user. The audio system 1412 can also be used for voice recognition applications. The UI 1404 can further include an image sensor 1413 such as a charged coupled device (CCD) camera for capturing still or moving images.

The power supply 1414 can utilize common power management technologies such as replaceable and rechargeable batteries, supply regulation technologies, and/or charging system technologies for supplying energy to the components of the communication device 1400 to facilitate long-range or short-range portable applications. Alternatively, or in combination, the charging system can utilize external power sources such as DC power supplied over a physical interface such as a USB port or other suitable tethering technologies.

The location receiver 1416 can utilize location technology such as a global positioning system (GPS) receiver capable of assisted GPS for identifying a location of the communication device 1400 based on signals generated by a constellation of GPS satellites, which can be used for facilitating location services such as navigation. The motion sensor 1418 can utilize motion sensing technology such as an accelerometer, a gyroscope, or other suitable motion sensing technology to detect motion of the communication device 1400 in three-dimensional space. The orientation sensor 1420 can utilize orientation sensing technology such as a magnetometer to detect the orientation of the communication device 1400 (north, south, west, and east, as well as combined orientations in degrees, minutes, or other suitable orientation metrics).

The communication device 1400 can use the transceiver 1402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1400.

Other components not shown in FIG. 14 can be used in one or more embodiments of the subject disclosure. For instance, the communication device 1400 can include a reset button (not shown). The reset button can be used to reset the controller 1406 of the communication device 1400. In yet another embodiment, the communication device 1400 can also include a factory default setting button positioned, for example, below a small hole in a housing assembly of the communication device 1400 to force the communication device 1400 to re-establish factory settings. In this embodiment, a user can use a protruding object such as a pen or paper clip tip to reach into the hole and depress the default setting button. The communication device 1400 can also include a slot for adding or removing an identity module such as a Subscriber Identity Module (SIM) card. SIM cards can be used for identifying subscriber services, executing programs, storing subscriber data, and so forth.

The communication device 1400 as described herein can operate with more or less of the circuit components shown in FIG. 14. These variant embodiments can be used in one or more embodiments of the subject disclosure.

The communication device 1400 can be adapted to perform the functions of devices of FIGS. 1-13, the media processor 1106, the media devices 1108, or the portable communication devices 1116 of FIG. 11, as well as the IMS CDs 1201-1202 and PSTN CDs 1203-1205 of FIG. 12. It will be appreciated that the communication device 1400 can also represent other devices that can operate in 100, 300, 400, 800, 900, 950 of FIGS. 1, 3-4, 8A-8D, and 9A-9B, communication systems 1100-1200 of FIGS. 11-12 such as a gaming console and a media player. In addition, the controller 1406 can be adapted in various embodiments to perform the functions 1162 and 1272, respectively.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 15 depicts an exemplary diagrammatic representation of a machine in the form of a computer system 1500 within which a set of instructions, when executed, may cause the machine to perform any one or more of the methods described above. One or more instances of the machine can operate, for example, as the network manager 1130 and other devices described herein. In some embodiments, the machine may be connected (e.g., using a network 1526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor (or controller) 1502 (e.g., a central processing unit (CPU)), a graphics processing unit (GPU, or both), a main memory 1504 and a static memory 1506, which communicate with each other via a bus 1508. The computer system 1500 may further include a display unit 1510 (e.g., a liquid crystal display (LCD), a flat panel, or a solid state display). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520. In distributed environments, the embodiments described in the subject disclosure can be adapted to utilize multiple display units 1510 controlled by two or more computer systems 1500. In this configuration, presentations described by the subject disclosure may in part be shown in a first of the display units 1510, while the remaining portion is presented in a second of the display units 1510.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee), and long-range communications (e.g., WiMAX, GSM, CDMA, LTE) can be used by computer system 1500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
   a processing system including a processor; and
   a memory that stores executable instructions that, when executed by the processing system, facilitate performance of operations, comprising:
      receiving training data comprising a plurality of historical states for each of a plurality of network resources of a communication network;
      generating a first Riemannian geometry of the communication network according to the plurality of historical states for each of the plurality of network resources, wherein each of the plurality of network resources is one of a vertex or an edge within the first Riemannian geometry;
      determining a first plurality of paths along the first Riemannian geometry, wherein each path in the first plurality of paths comprises at least one of the plurality of network resources;
      determining a velocity vector of each path of the first plurality of paths according to at least one state of the plurality of historical states;
      identifying a first group of velocity vectors that generate a first sub-geometry within the first Riemannian geometry; and
      provisioning a first portion of the plurality of network resources according to the first group of velocity vectors and the first sub-geometry.

2. The device of claim 1, wherein each velocity vector of the first group of velocity vectors is associated with a velocity.

3. The device of claim 2, wherein the velocity of each velocity vector of the first group of velocity vectors represents one of a bandwidth capacity, processor capacity, and storage capacity.

4. The device of claim 2, wherein the operations further comprise:
   calculating a first aggregate velocity for the first group of velocity vectors according to the velocity associated with each velocity vector of the first group of velocity vectors; and
   determining the first aggregate velocity is above a predetermined threshold.

5. The device of claim 1, wherein the operations further comprise:
   identifying a second group of velocity vectors that generate a second sub-geometry within the first Riemannian geometry, wherein each velocity vector of the first group of velocity vectors and the second group of velocity vectors is associated with a velocity;
   calculating a first aggregate velocity for the first group of velocity vectors according to the velocity associated with each velocity vector of the first group of velocity vectors;
   calculating a second aggregate velocity for the second group of velocity vectors according to the velocity associated with each velocity vector of the second group of velocity vectors; and
   determining the first aggregate velocity is lower than the second aggregate velocity.

6. The device of claim 1, wherein identifying the first group of velocity vectors comprise implementing a game-theoretic approach in identifying the first group of velocity vectors.

7. The device of claim 1, wherein the operations comprise:
   monitoring a plurality of current states for each of the plurality of network resources in the communication network;
   calculating a current aggregate velocity for the first group of velocity vectors according to the plurality of current states;
   identifying a model error according to the current aggregate velocity and a first aggregate velocity; and
   determining the model error is above a tolerance.

8. The device of claim 7, wherein the operations further comprise:
   generating a second Riemannian geometry of the communication network according to the plurality of current states for each of the plurality of network resources, wherein each of the plurality of network resources is one of a vertex or an edge within the second Riemannian geometry;
determining a second plurality of paths along the second Riemannian geometry, wherein each path in the second plurality of paths comprises at least one of the plurality of network resources;
determining a velocity vector of each path of the second plurality of paths according to at least one state of the plurality of current states;
identifying a third group of velocity vectors that generate a third sub-geometry within the second Riemann geometry; and
provisioning a second portion of the plurality of network resources according to the third group of velocity vectors and the third sub-geometry.

9. A non-transitory computer-readable storage medium, comprising executable instructions that, when executed by a processing system including a processor, facilitate performance of operations, comprising:
receiving a plurality of historical states for each of a plurality of network resources of a communication network;
generating a first Riemannian geometry of the communication network according to the plurality of historical states for each of the plurality of network resources, wherein each of the plurality of network resources is one of a vertex or an edge within the first Riemannian geometry;
determining a first plurality of paths along the first Riemannian geometry, wherein each path in the first plurality of paths comprises at least one of the plurality of network resources;
determining a velocity vector of each path of the first plurality of paths according to at least one state of the plurality of historical states;
identifying a first group of velocity vectors that generate a first sub-geometry within the first Riemannian geometry;
calculating a first aggregate velocity for the first group of velocity vectors according to a velocity associated with each velocity vector of the first group of velocity vectors;
determining the first aggregate velocity is above a predetermined threshold; and
provisioning a first portion of the plurality of network resources according to the first group of velocity vectors and the first sub-geometry.

10. The non-transitory computer-readable storage medium of claim 9, wherein the velocity of each velocity vector of the first group of velocity vectors represents one of a bandwidth capacity, processor capacity, and storage capacity.

11. The non-transitory computer-readable storage medium of claim 9, wherein the operations further comprise:
identifying a second group of velocity vectors that generate a second sub-geometry within the first Riemannian geometry, wherein each velocity vector of the first group of velocity vectors and the second group of velocity vectors is associated with a velocity;
calculating a first aggregate velocity for the first group of velocity vectors according to the velocity associated with each velocity vector of the first group of velocity vectors;
calculating a second aggregate velocity for the second group of velocity vectors according to the velocity associated with each velocity vector of the second group of velocity vectors; and
determining the first aggregate velocity is lower than the second aggregate velocity.

12. The non-transitory computer-readable storage medium of claim 9, wherein identifying the first group of velocity vectors comprise implementing a game-theoretic approach in identifying the first group of velocity vectors.

13. The non-transitory computer-readable storage medium of claim 9, wherein the operations comprise:
monitoring a plurality of current states for each of the plurality of network resources in the communication network;
calculating a current aggregate velocity for the first group of velocity vectors according to the plurality of current states;
identifying a model error according to the current aggregate velocity and the first aggregate velocity; and
determining the model error is above a tolerance.

14. The non-transitory computer-readable storage medium of claim 13, wherein the operations comprise:
generating a second Riemannian geometry of the communication network according to the plurality of current states for each of the plurality of network resources, wherein each of the plurality of network resources is one of a vertex or an edge within the second Riemannian geometry;
determining a second plurality of paths along the second Riemannian geometry, wherein each path in the second plurality of paths comprises at least one of the plurality of network resources;
determining a velocity vector of each path of the second plurality of paths according to at least one state of the plurality of current states;
identifying a third group of velocity vectors that generate a third sub-geometry within the second Riemann geometry; and
provisioning a second portion of the plurality of network resources according to the third group of velocity vectors and the third sub-geometry.

15. A method, comprising:
monitoring, by a processing system including a processor, a plurality of current states for each of a plurality of network resources in a communication network;
calculating, by the processing system, a current aggregate velocity for a first group of velocity vectors according to the plurality of current states;
identifying, by the processing system, a model error according to the current aggregate velocity and a first aggregate velocity, wherein the first aggregate velocity is for the first group of velocity vectors according to a plurality of historical states for each of the plurality of network resources;
determining, by the processing system, that the model error is above a tolerance;
generating, by the processing system, a first Riemannian geometry of the communication network according to the plurality of historical states for each of the plurality of network resources, wherein each of the plurality of network resources is one of a vertex or an edge within the first Riemannian geometry, wherein the first group of velocity vectors generates a first sub-geometry within the first Riemannian geometry; and
provisioning, by the processing system, a first portion of the plurality of network resources according to the first group of velocity vectors and the first sub-geometry.

16. The method of claim 15, comprising:
- receiving, by the processing system, training data comprising the plurality of historical states for each of the plurality of network resources of the communication network;
- determining, by the processing system, a first plurality of paths along the first Riemannian geometry, wherein each path in the first plurality of paths comprises at least one of the plurality of network resources; and
- determining, by the processing system, a velocity vector of each path of the first plurality of paths according to at least one state of the plurality of historical states.

17. The method of claim 16, comprising:
- calculating, by the processing system, the first aggregate velocity for the first group of velocity vectors according to a velocity associated with each velocity vector of the first group of velocity vectors; and
- determining, by the processing system, the first aggregate velocity is above a predetermined threshold.

18. The method of claim 16, comprising:
- identifying a second group of velocity vectors that generate a second sub-geometry within the first Riemannian geometry, wherein each velocity vector of the first group of velocity vectors and the second group of velocity vectors is associated with a velocity;
- calculating the first aggregate velocity for the first group of velocity vectors according to the velocity associated with each velocity vector of the first group of velocity vectors;
- calculating a second aggregate velocity for the second group of velocity vectors according to the velocity associated with each velocity vector of the second group of velocity vectors; and
- determining the first aggregate velocity is lower than the second aggregate velocity.

19. The method of claim 16, wherein identifying the first group of velocity vectors comprise implementing a game-theoretic approach in identifying the first group of velocity vectors.

20. The method of claim 15, comprising:
- generating, by the processing system, a second Riemannian geometry of the communication network according to the plurality of current states for each of the plurality of network resources, wherein each of the plurality of network resources is one of a vertex or an edge within the second Riemannian geometry;
- determining, by the processing system, a second plurality of paths along the second Riemannian geometry, wherein each path in the second plurality of paths comprises at least one of the plurality of network resources;
- determining, by the processing system, a velocity vector of each path of the second plurality of paths according to at least one state of the plurality of current states;
- identifying, by the processing system, a third group of velocity vectors that generate a third sub-geometry within the second Riemann geometry; and
- provisioning, by the processing system, a second portion of the plurality of network resources according to the third group of velocity vectors and the third sub-geometry.

* * * * *